US012589609B2

(12) United States Patent
Sawin et al.

(10) Patent No.: US 12,589,609 B2
(45) **Date of Patent: *Mar. 31, 2026**

(54) LASER MARKED ARTICLES WITH MACHINE READABLE CODES

(71) Applicant: The Procter & Gamble Company, Cincinnati, OH (US)

(72) Inventors: Philip Andrew Sawin, Wyoming, OH (US); Matthew Aaron Neumann, Montgomery, OH (US); Joseph Craig Lester, Liberty Township, OH (US); Marc Andrew Mamak, Mason, OH (US); Erika Arlene Womack, Cincinnati, OH (US); Ariel Lebron, Cincinnati, OH (US); Joseph Henry Nurre, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 327 days.

This patent is subject to a terminal disclaimer.

(21) Appl. No.: 18/128,356

(22) Filed: Mar. 30, 2023

(65) Prior Publication Data

US 2024/0326157 A1 Oct. 3, 2024

(51) Int. Cl.
*B41M 5/26* (2006.01)

(52) U.S. Cl.
CPC ............... *B41M 5/267* (2013.01); *B41M 5/26* (2013.01)

(58) Field of Classification Search
CPC ................................ B41M 5/26; B41M 5/267
See application file for complete search history.

(56) References Cited

U.S. PATENT DOCUMENTS

| | | | |
|---|---|---|---|
| 3,490,290 | A | 1/1970 | Bilson |
| 4,990,792 | A | 2/1991 | Frei |
| 5,123,574 | A | 6/1992 | Poulos |
| 5,429,908 | A | 7/1995 | Hokuf |
| 6,118,096 | A | 9/2000 | Feng et al. |
| 6,423,399 | B1 | 7/2002 | Endo |
| 6,681,055 | B1 | 1/2004 | Sato |

(Continued)

FOREIGN PATENT DOCUMENTS

| | | | |
|---|---|---|---|
| CN | 101564947 | B | 12/2010 |
| CN | 106674948 | A | 5/2017 |

(Continued)

OTHER PUBLICATIONS

All Office Actions; U.S. Appl. No. 17/963,215, filed Oct. 11, 2022.

(Continued)

*Primary Examiner* — Gerard Higgins
(74) *Attorney, Agent, or Firm* — Matthew J. Spegele

(57) ABSTRACT

A sheet of material that is marked in a predetermined pattern with a pulsed laser on its outer surface. The sheet material is a layered material that has an outer surface and an inner surface separated by a core. There is a first layer comprising a first material beginning at the outer surface and extending into the core and there is a second layer containing the second material within the core. The outer surface further has a patch, that is a region of the outer surface where the second material is disposed at the outer surface, and at least a portion of the laser marks are disposed on the patch.

19 Claims, 9 Drawing Sheets

(56) References Cited

U.S. PATENT DOCUMENTS

| | | | |
|---|---|---|---|
| 7,009,633 | B2 | 3/2006 | Steenackers |
| 7,394,479 | B2 | 7/2008 | Assa |
| 7,649,154 | B2 | 1/2010 | Ripperger et al. |
| 8,663,754 | B2 | 3/2014 | Liu et al. |
| 9,168,696 | B2 | 10/2015 | Farrell |
| 9,269,035 | B2 | 2/2016 | Redd |
| 9,636,776 | B2 | 5/2017 | Dallarosa et al. |
| 9,764,563 | B2 | 9/2017 | Song et al. |
| 10,365,499 | B2 | 7/2019 | Schaur et al. |
| 10,377,145 | B2 | 8/2019 | Song et al. |
| 10,942,055 | B1 | 3/2021 | Zhong |
| 2004/0247829 | A1 | 12/2004 | Depres |
| 2005/0218126 | A1 | 10/2005 | Leyvraz |
| 2006/0197826 | A1 | 9/2006 | Assa et al. |
| 2010/0209698 | A1 | 8/2010 | Kornherr |
| 2011/0198837 | A1 | 8/2011 | Parrinello |
| 2011/0308335 | A1* | 12/2011 | Pink ...................... B01L 3/5453 73/864.91 |
| 2012/0324997 | A1 | 12/2012 | Tharp |
| 2014/0206030 | A1 | 7/2014 | Gelfand |
| 2014/0305831 | A1 | 10/2014 | Hansen |
| 2016/0256955 | A1 | 9/2016 | Andrei et al. |
| 2016/0263701 | A1 | 9/2016 | Li et al. |
| 2018/0350271 | A1 | 12/2018 | Schmitt |
| 2019/0056322 | A1 | 2/2019 | Schulz et al. |
| 2019/0112091 | A1 | 4/2019 | Neufarth et al. |
| 2019/0138867 | A1 | 5/2019 | Vander Aa |
| 2019/0193445 | A1 | 6/2019 | Harrison et al. |
| 2021/0334056 | A1 | 10/2021 | Gabato et al. |
| 2022/0097414 | A1 | 3/2022 | Hirayama |
| 2022/0281254 | A1 | 9/2022 | Kokkelenberg |
| 2022/0410608 | A1 | 12/2022 | Hirayama et al. |
| 2023/0121684 | A1 | 4/2023 | Lester et al. |
| 2023/0124975 | A1 | 4/2023 | Lester et al. |
| 2023/0191532 | A1 | 6/2023 | Lester et al. |
| 2023/0191818 | A1 | 6/2023 | Lester et al. |
| 2023/0211624 | A1 | 7/2023 | Sato |
| 2024/0326171 | A1 | 10/2024 | Lester |
| 2024/0326500 | A1 | 10/2024 | Neumann |
| 2024/0326502 | A1 | 10/2024 | Neumann |
| 2024/0328844 | A1 | 10/2024 | Lester |
| 2024/0328845 | A1 | 10/2024 | Lester |
| 2024/0391019 | A1 | 11/2024 | Lester |
| 2025/0083464 | A1 | 3/2025 | Neumann et al. |

FOREIGN PATENT DOCUMENTS

| | | | |
|---|---|---|---|
| CN | 107672335 | A | 2/2018 |
| EP | 0327508 | A2 | 8/1989 |
| EP | 1939002 | A2 | 7/2008 |
| EP | 2184738 | A1 | 5/2010 |
| EP | 3088200 | A1 | 11/2016 |
| EP | 3711966 | A1 | 9/2020 |
| GB | 2421221 | A | 6/2006 |
| JP | S63295080 | A | 12/1988 |
| JP | 3705081 | B2 | 12/2001 |
| JP | 2002144055 | A | 5/2002 |
| JP | 2002283073 | A | 10/2002 |
| JP | 2005066653 | A | 3/2005 |
| JP | 2006255718 | A | 9/2006 |
| JP | 3141949 | U | 5/2008 |
| JP | 2015100808 | A | 6/2015 |
| JP | 6220587 | B2 | 10/2017 |
| JP | 2018192800 | A | 12/2018 |
| JP | 2019026285 | A | 2/2019 |
| JP | 2019034752 | A | 3/2019 |
| JP | 2020152435 | A | 9/2020 |
| WO | 9412352 | A1 | 6/1994 |
| WO | 0035678 | A1 | 6/2000 |
| WO | 2010011227 | A1 | 1/2010 |
| WO | 2012145306 | A2 | 10/2012 |
| WO | 2012150926 | A1 | 11/2012 |
| WO | 2013183000 | A1 | 12/2013 |
| WO | 2015082869 | A1 | 6/2015 |
| WO | 2016162753 | A1 | 10/2016 |
| WO | 2017198986 | A1 | 11/2017 |
| WO | 2021219850 | A1 | 11/2021 |
| WO | 2023064739 | A1 | 4/2023 |
| WO | 2023064740 | A1 | 4/2023 |

OTHER PUBLICATIONS

All Office Actions; U.S. Appl. No. 17/963,214, filed Oct. 11, 2022.
All Office Actions; U.S. Appl. No. 17/987,893, filed Nov. 16, 2022.
All Office Actions; U.S. Appl. No. 17/987,895, filed Nov. 16, 2022.
All Office Actions; U.S. Appl. No. 18/127,965, filed Mar. 29, 2023.
All Office Actions; U.S. Appl. No. 18/127,976, filed Mar. 29, 2023.
All Office Actions; U.S. Appl. No. 18/128,359, filed Mar. 30, 2023.
All Office Actions; U.S. Appl. No. 18/128,341, filed Mar. 30, 2023.
All Office Actions; U.S. Appl. No. 18/128,347, filed Mar. 30, 2023.
U.S. Appl. No. 18/127,965, filed Mar. 29, 2023, to Joseph Craig Lester et al.
U.S. Appl. No. 18/127,976, filed Mar. 29, 2023, to Joseph Craig Lester et al.
U.S. Appl. No. 18/128,359, filed Mar. 30, 2023, to Joseph Craig Lester et al.
U.S. Appl. No. 18/128,341, filed Mar. 30, 2023 to Matthew Aaron Neumann et al.
U.S. Appl. No. 18/128,347, filed Mar. 30, 2023 to Matthew Aaron Neumann et al.
All Office Actions; U.S. Appl. No. 18/631,142, filed Apr. 10, 2024.
U.S. Appl. No. 18/631,142, filed Apr. 10, 2024, to Joseph Craig Lester et al.
PCT Search Report and Written Opinion for PCT/US2024/022137 dated Jul. 1, 2024, 13 pages.
All Office Action: U.S. Appl. No. 18/956,144, filed Nov. 22, 2024.
U.S. Appl. No. 18/956,144, filed Nov. 22, 2024, Matthew Aaron Neumann et al.

* cited by examiner

LASER MARKED ARTICLES WITH MACHINE READABLE CODES

FIELD OF THE INVENTION

The present invention relates to laser-marked sheet materials with machine readable codes such as barcodes and QR-codes and articles comprising such sheet materials. The invention also relates to laser-marked sheet materials with machine readable codes and clear/decorative outer layers and articles comprising such sheet materials.

BACKGROUND OF THE INVENTION

Short-pulse laser decoration utilizes energy from nano, pico and femto short pulse lasers across a variety of wavelengths and energies to mark decorative patterns onto articles such as products and/or packages. Any and all other decoration techniques that may apply to the product and/or package (i.e. labels, screen print, digital print, etc.) can be used together with laser marking to achieve various decorative and functional effects. The laser technique used in short pulse laser marking is, importantly, a high through-put technique which uses a stationary laser source from which the laser beam is directed by means of electronically/mechanically controlled mirrors (i.e. "galvo" sets) and lenses (i.e. F-theta and similar lenses) to the product or package being marked. These mirrors and lenses steer the laser beam across the surface of the article (this steering is also called "scanning") so that the laser can impart an image, such as a digital image (for example from a computer file such as a PDF file) to the surface of the package or product. This approach has further advantages over other decoration techniques in that the use of a digital image allows for customization and personalization of the decoration.

There is a great deal of interest in the possibilities presented by laser-marking articles such as by means of short-pulse laser marking. For example, replacing adhesive labels on polymer containers is not only economically beneficial, but ecologically beneficial as well. Eliminating adhesive labels on polymer containers, for example, decreases the total weight of the packaging material which reduces the amount of petroleum-derived material per package and reduces the weight of the packaging thereby requiring less fuel for shipping. Further, the absence of an adhesive label enables the polymeric container to be more easily recycled since adhesive labels often need to be removed prior to recycling due to the potential impurities which may be introduced to the recycle stream.

Laser marking of small articles (i.e. golf balls, etc.) and/or small regions on articles (i.e. date codes on finished packages, address labels) is known. While lasers are improving, and newer lasers have a variety of energies and wavelengths, these marking processes can still be slow and expensive. Further, they do not have the ability to mark small characters that require high-precision such as small-font text (i.e. usage instructions, ingredient listing) comprised of alphanumeric characters. For example, date codes are marked onto packages by relatively quick lasers, but they employ single lines of large, imprecisely, or unequally spaced spots (in the range of 250 μm to greater than 800 μm in diameter) and relatively large font characters. This is equivalent to printing stick figures, which are adequate for some purposes but difficult for consumers to read and almost impossible for machines to read. More specifically, single lines of large, imprecisely, or unequally spaced spots cannot currently be used to mark high-precision small font text or machine-readable graphics such as UPC or QR codes on articles. More specifically, even when UPC, QR, Data matrix or other machine-readable codes are printed on polymeric articles with exterior decorative coatings, pearl essence for example, the exterior coating can scatter light making it difficult to read these codes. Thus, some decorative articles present very specific problems with respect to machine readable codes.

The current state of the art for laser marking apparatuses and processes generally includes a laser which generates a laser beam and a scanner, that directs the beam to the article surface to be marked. Scanners may use a set of mirrors that are directed by galvo-sets to the article surface or may use a polygon scanner. Apparatuses that utilize galvo sets include "raster" marking processes and "vector" marking processes. These are either fast but with poor precision and resolution, or slow but with higher precision and resolution. The combination of high speed and high precision does not exist in the prior art. This problem is particularly notable when marking large areas on articles, such as when using laser-marking as a full replacement for other decoration techniques, where all the text and/or graphics provided on at least one face of the article (much of which is required for regulatory purposes) is provided via laser-marking. Large area marking can be facilitated by polygon scanners, but these lack flexibility in terms of changing images.

A raster laser marking process lays down individual laser marks in a grid, and the image is marked by the laser row by row, point by point. Each of the pulses is "gated" such that pulses are only fired for a dark pixel of the image and no pulse is fired for the light pixel of the image (or visa versa). Each of the pulses is individually gated and the pulse energy of each pulse can be varied to produce grayscale. State-of-the-art raster marking processes are effectively limited to lasers with a ~100 kHz repetition rate given the practical limit of a ~10 us update rate in signaling the laser's on/off function (i.e. "gating") and can only be made faster by increasing the pulse-spacing, which can sacrifice fine detail, such as required to mark small-font text and graphics.

Vector marking processes can be run above 100 kHz as the pulses are typically gated open while the laser beam is "steered" (by mirrors) in the shape of the vector-lines being marked. Vector-marked articles comprising text can often be recognized as the marked lines are typically one-pulse wide (unless in-filled) and the pulses become closer together near the corners, where the surface velocity of the laser beam was slowed as it turned the corner. However, it has been found that the accuracy of the placement of the marks with vector-marking suffers at very high surface velocities of the laser beam.

High-speed laser-marking can be achieved by polygon scanners (e.g. High Throughput Raster Processing Polygon scanner systems from Next Scan Technology, Evergem, Belgium), which can be optimized for high speed and accuracy. The polygon scanner systems employ a rotating polygon mirror for row scanning. These scanners are typically used for full-surface processing of a regular pattern. Specifically, the field of view is typically a square, which is relatively large by printing standards, and a repeated pattern is marked in its entirety over and over again on subsequent articles. The square field of view configuration of these scanners may not lend them to accurate marking of things like small characters, alphanumeric characters, logos, pictures and the like.

While high speed is important for high throughput, high precision is important for legibility of the laser marked pattern, which is important when marking text (i.e. for human legibility) and when marking machine-readable codes such as bar codes, UPC codes, QR codes and the like (i.e. for machine legibility). The quality of the laser marks and the precision of their locations on the article are both important to legibility of the laser marked pattern.

It has further been found that machine-legibility is compromised when laser-marked machine-readable codes are marked on an interior layer of a multi-layer sheet material, even when the outer layer of the sheet material is transparent. The addition of decorative additives, such as effect pigments, to the outer transparent layer can further exacerbate the problem.

Thus, there remains the need for laser-marked sheet materials, and articles formed from such sheet materials, that include machine-legible laser marked machine readable codes. There is a further need for laser-marked sheet materials with a transparent/decorative outer layer, and articles formed from such sheet materials, that include machine-legible laser marked machine readable codes.

SUMMARY OF THE INVENTION

The present invention provides a solution for one or more of the deficiencies of the prior art as well as other benefits. The specification, claims and drawings describe various features and embodiments of the invention, including a sheet of material that is marked with a pulsed laser, the sheet of material has an outer surface and an inner surface separated by a core, wherein there is a first layer beginning at the outer surface and extending into the core less than about 60 microns. There is a second layer that begins where the first layer ends, is at least about 2.5 microns from the outer surface, and begins no greater than 60 microns from the outer surface. The first layer is substantially free of pigments and laser marking additives and optionally the first layer contains a decorative additive selected from the group consisting of pearlescence, iridescence, sparkle, metallics (aluminum, copper, gold flakes), matting/frosting agents, dyes and toners and combinations of these. The laser marking additive in the second layer may be $TiO_2$ or an IR laser marking additive. When the laser marking additive is $TiO_2$, the second layer has an average concentration of $TiO_2$ within the range of from about 5.00% to about 12.00%, preferably from about 5.75% to about 10.00%, more preferably from about 6.00% to about 9.50%, and even more preferably from about 7.00% to about 8.50%, by weight, of the second layer. When the laser marking additive is an IR laser marking additive, the second layer has an average concentration of the IR laser marking additive within the range of from about 0.005% to about 2.00%, preferably from about 0.0075% to about 1.80%, more preferably from about 0.010% to about 1.60%, and even more preferably from about 0.020% to about 1.50%, by weight, of the second layer. Preferably the sheet of material is polymeric.

In one embodiment, the first material of the sheet of material is colored or dark as measured by L*, a*, b* and provides poor contrast with the laser marks. In a further embodiment, the second material is lightly colored or white and provides good contrast with the laser marks. Preferably, the sheet of material forms an article that can be a garbage bag, a bottle, a sachet, a tube, a film, a laminate, a bag, a wrap, a drum, a jar, a cup, or a cap. In one embodiment of the present invention, the laser marking on the sheet material includes a UPC, QR, Data matrix or other machine-readable code, and the $\Delta L$ of the laser-marked code relative to the unmarked portion of the patch material is greater than 40. In another embodiment of the present invention, the laser marking on the patch. In another one embodiment of the present invention, the laser marking on the sheet of material is a UPC, QR, Data matrix or other machine-readable code, and the machine-readable code has a score of 1.5 or better on the ISO/IEC15416 (2016) (for 1-Dimensional Bar Codes) and ISO/IEC15415 (2011) (for 2-dimensional bar codes specification). The machine-readable code may be a two-dimensional bar code symbol with a grade of greater than or equal to 1 based on verification according to ISO/IEC15415 (2011). Preferably, the machine-readable code is in the patch.

In yet another embodiment of the present invention the laser marking by the pulsed laser comprises a predetermined pattern of locations each comprising a mark or a void in a grid pattern, wherein the predetermined pattern comprises alphanumeric characters in the form of text having a font size within the range of 6 pt to 10 pt, or 11 pt to 16 pt. The grid pattern has a plurality of locations positioned in two or more rows, wherein the two or more rows are substantially parallel, each adjacent pair of locations of the plurality of locations along any of the two or more rows is separated by an X-distance and each adjacent pair of the two or more rows is separated by a Y-distance. The Y-distance is at least 1.2, preferably 1.5, more preferably 1.7, and even more preferably 2 times the X-distance when the font size is 6 pt to 10 pt. When the font size is within the range of 11 pt to 16 pt, the Y-distance is at least 2, preferably 2.5, more preferably 3, and even more preferably 4 times the X-distance.

In another embodiment of the present invention there is a sheet of material that is marked by a pulse laser, and the sheet of material forms an article having an outer surface and an outer surface area, and within the outer surface area there is a patch having a patch surface and a patch surface area that is less than about 49.00%, preferably less than about 40.00%, more preferably less than about 25.00% and even more preferably less than about 10.00% of the outer surface area. Further, the average concentration of the laser marking additive on the patch surface within the patch surface area is greater than about 2.50% of the average concentration of the laser marking additive on the outer surface that is outside of the patch surface area.

In another embodiment the sheet material forms an article and the laser marking forms a machine-readable code and the laser-marked machine-readable code is disposed on the patch. The present invention provides many benefits over the prior art. Because the laser marking can be, for example, consumer readable alphanumeric characters, sentences, paragraphs, and other methods of visual communication which can be marked on an article without the need of traditional labels. Specifically, the processes and articles of this invention can be marked with ingredient listings, use instructions, UPC codes, and the like, in a fast, cost-effective manner without labels and adhesives. The present invention further solves problems associated with decorative articles. More specifically, decorative outer layers and/or additives on the exterior of an article can interfere with the laser marking and/or machine-readability of symbols and codes such as UPC codes and QR codes of those articles. For example, a clear outer layer provides a visual effect of depth, and the further addition of pearlescent additives on the outside, can result in a pretty shampoo bottle, but can also interfere with light transmission, rendering it difficult for a machine, such as a UPC code reader, to read the laser marked code that occurs beneath the surface of the bottle.

The present invention further solves problems associated with decorative/colored articles. More specifically, articles that have decorative outer surfaces, such as colored surfaces that provide a ΔL of less than 40 versus a laser marked area on that surface can be laser-marked on the patch which provides a ΔL of greater than 40.

The ability to laser mark such text, symbols and codes provides cost savings, is environmentally friendly (fewer wasteful stickers on a package and/or no need for a coating) and allows for instantaneous change in the message communicated to the consumer. For example, if an ingredient is changed in a formula, new ingredient labels can be marked on the article as soon as the change can be made in the computer instructions to the laser apparatus. No new labels/coating are required.

DETAILED DESCRIPTION OF THE INVENTION

Article

Figure 1:
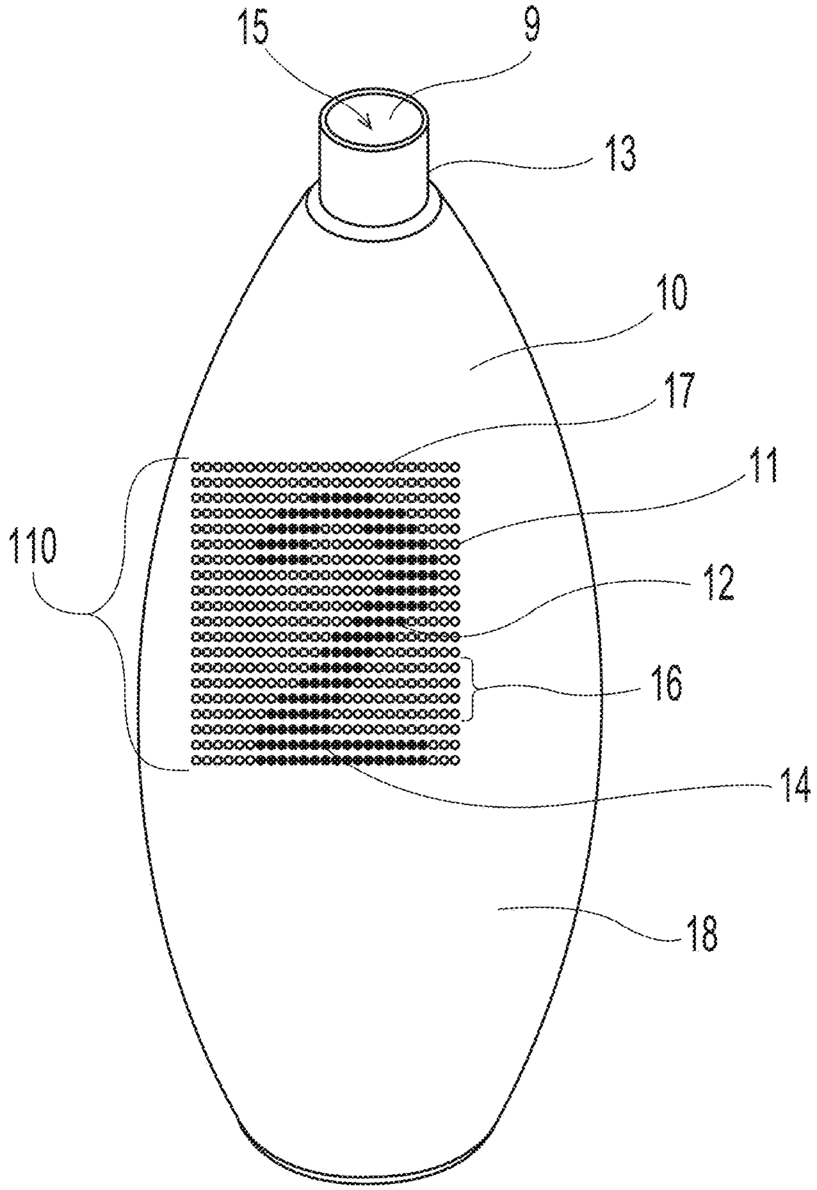
FIG. 1 is an article in accordance with the present invention marked with an alphanumeric character in a grid pattern.

"Article", as used herein refers to an individual object such as an object for consumer usage, such as a container suitable for containing materials or compositions. The article may be a container, non-limiting examples of which include bottles, tubes, films, laminates, bags, wraps, drums, jars, cups, caps, and the like. The compositions contained in such containers may be any of a variety of compositions including, but not limited to detergents (e.g., laundry detergent, fabric softener, dish care, skin and hair care), beverages, powders, paper (e.g., tissues, wipes), diapers, beauty care compositions (e.g., cosmetics, lotions), medicinal, oral care (e.g., toothpaste, mouth wash), and the like. Containers may be used to store, transport, and/or dispense the materials and/or compositions contained therein. The article can be made of any a variety of common materials including; PET, PETG, HDPE, PP, PVOH, LDPE, LLDPE, steel, glass, aluminum, cellulose, pulp, paper, etc.

"Sheet material" as used herein refers to any structure wherein the thickness is substantially less than the length and width. Sheet materials include flexible sheet materials such as films and laminates as well as rigid materials such as bottle walls which may be formed by blow-molding preforms or parisons. Films and laminates may be rolled up to form tubes or other containers.

"Blow molding" refers to a manufacturing process by which hollow cavity-containing plastic articles such as bottles are formed, preferably suitable for containing compositions. The blow molding process typically begins with melting or at least partially melting or heat-softening (plasticating) the thermoplastic and forming it into a parison (when using Extrusion Blow Molding) or preform (when using injection blow molding or injection stretch blow molding), where said parison or preform can be formed by a molding or shaping step such as by extrusion through a die head or injection molding. The parison or preform is a tube-like piece of plastic with a hole in one end through which compressed gas can pass. The parison or perform is typically clamped into a mold and air is pumped into it, sometimes coupled with mechanical stretching of the parison or perform (known as "stretch blow-molding"). The parison or preform may be preheated before air is pumped into it. The pressure pushes the thermoplastic out to conform to the shape of the mold containing it. Once the plastic has cooled and stiffened, the mold is opened and the part ejected. In general, there are three main types of blow molding: extrusion blow molding (EBM), injection blow molding (IBM), and injection stretch blow molding (ISBM).

"Layer", as used herein refers to striated regions within the sheet material that includes at least portions that are roughly parallel to the external surface(s) of the sheet material. Exemplary embodiments of sheet materials include co-extruded material such as for forming films, and layered materials for bottle making such as co-blown materials such as parisons used on forming bottle, co-injected materials used in forming bottle preforms, over-molded preforms. "Layer", as used herein, does not include painted, printed such as with ink, or coated-on materials or labels including in-mold labels.

FIG. 1 shows an article 10 having a predetermined feature 17 laser marked as a grid 16. The predetermined feature 17 can be consumer readable, machine readable or both. Predetermined feature 17 can be, for example, an alphanumeric character, a company logo, a drawing, artwork, UPC or QR codes, and the like. In this instance, the marked locations 12 make up an alphanumeric character 14, which in this case is the number two, "2". The unmarked locations 11 in grid 16 are shown for illustration purposes only and do not appear on the final marked article 10. Article 10 is shown as a container and has an opening 2 and a neck 13 that provides access to the interior space 15.

Additionally, article 10 has an outer surface 18 that has an outer surface area defined by the article surface boundary. Patch 110, which has a patch surface area defined by the square boundary of patch 110, is shown as a portion of the article outer surface 18. Patch 110 can be any geometry known to those skilled in the art. The surface area of patch 110 and the article outer surface are 18 can be calculated by standard mathematical principles known to those skilled in the art (Length times width for a rectangle, one half the base times the height for right triangles, $\pi r^2$ for a circle, etc.). The surface area of patch 110 should be less than about 49.00%, preferably less than about 40.00%, more preferably less than about 25.00% and even more preferably less than about 10.00% of the outer surface area of article outer surface 18. The laser marking additive in the second layer may be $TiO_2$ or an IR laser marking additive. When the laser marking additive is $TiO_2$, the second layer has an average concentration of $TiO_2$ within the range of from about 2.50% to about 10.00%, preferably from about 2.75% to about 8.00%, more preferably from about 2.90% to about 7.00%, and even more preferably from about 3.00% to about 6.50%, by weight, of the second layer. When the laser marking additive is an IR laser marking additive, the second layer has an average concentration of the IR laser marking additive within the range of from about 0.005% to about 2.00%, preferably from about 0.0075% to about 1.80%, more preferably from about 0.010% to about 1.60%, and even more preferably from about 0.020% to about 1.50%, by weight, of the second layer. The machine-readable code may be disposed on the patch.

The patch may be integral to the sheet material. The sheet material may be a layered material (FIG. 7*a*), and the patch may be formed by a subsurface layer being pushed to the outer surface of the sheet material. In one embodiment, the sheet material is a multi-layer co-extruded material and the patch is formed by a protrusion within the die-head that diverts one or more of the outer layers to either side, exposing the next layer. Alternately, a separate flow of material can be added to a portion of the extruded sheet. In another embodiment, the article formed form the sheet material is a bottle formed from a blow-molded co-extruded parison where a protrusion within the die-head diverts one or more of the outer layers to either side, exposing the next layer. Alternately, a separate flow of material can be added to a portion of the parison. In another embodiment the article formed form the sheet material is a bottle formed from a blow-molded co-injection molded bottle preform and the patch is formed by a delta in relative pressures between the core and outer layer in which the core is exposed to the surface of the finished preform. In another embodiment the article formed form the sheet material is a bottle formed from a blow-molded co-injection molded bottle preform and the patch is formed by molding a portion of the finished preform, transferring article to another cavity in which an additional shot is injection molded onto at least a portion of the first.

While not wanting to be bound by any theory, certain decorative article surfaces may be difficult to laser-mark legibly as the laser marks themselves may not contrast with the hue of the article surface. High-speed laser marking processes (such as CV-bitmap) may not provide for much variation in the color/darkness of the laser marks themselves. While it is known to confer gray-scale to laser-marked images (also called "dithering"), this requires is a relatively slow laser-marking process (i.e. raster). High-speed laser-marking processes generally require pulsed lasers where the energy-per-pulse does not vary substantially pulse-to-pulse. High-speed laser marking may provide that groups of pulses are of about the same energy. High-speed laser marking may provide that all of the pulses used in marking a given predetermined pattern or image are of about the same energy.

It is also known to produce either dark marks or light marks depending on the energy-per-pulse provided by the pulsed-laser. For example, when laser-marking on a plastic material, a laser may provide for foaming of the material thereby providing a light mark, or the laser may provide for carbonization or reduction/oxidation of a laser marking additive, thereby causing a dark mark. As such, high-speed laser-marking may make light marks or dark marks, but it may not be possible to vary the shade of the marks over the course of marking a given predetermined pattern; all the marks may be darks marks or all the marks may be light marks.

Humans can typically see finer contrast than machines that read machine-readable codes. For example, UPC codes are commonly graded by a device such as an Axicon 15500 verifier operating using 660 nm visible light. Thus, having a small patch area with higher contrast at the surface allows the machine-readable code to be marked on the surface while the remainder of the bottle maintains its decorative appearance. Making the patch surface area approximately equal in size and/or shape to the machine-readable code, makes the absence of the decorative coating on the patch less noticeable to the consumer.

To provide that the laser-marks are legible it can be practical that there be a difference in lightness between the outer surface coincident with the laser-marked image and the outer surface remote from the laser-marked image It may specifically be preferred to dispose the laser marks comprising the machine-readable code, which requires higher contrast than human-readable text, i n the patch material. The laser marks may be dark marks and the second material may be a light material (i.e. with an L* value of greater than 90), or the laser marks may be light marks and the second material may be a dark material (i.e. L*<90). It will be appreciated that any of the color metrics including L*, a*, b* and E* may be used to express the color and contrast of the laser-marked image and the material remote from the laser-marked image.

In the CIELAB color space framework, the difference in lightness can be characterized by L* as measured by the 95% Delta Color Value Measurement described herein. The outer surface can have a ΔL that is the absolute value of L* of the outer surface coincident with the laser-marked image minus the L* of the outer surface remote from the laser-marked image.

The outer surface coincident with the laser-marked image can have a first color and the outer surface remote from the laser-marked image can have a second color. The first color and the second color are measured the 95% Delta Color Value Measurement described herein. The first color and the second color can have a difference in color calculated using L*, a*, and b* values by the formula $\Delta E=[(L^*_X-L^*_Y)^2+(a^*_X-a^*_Y)^2+(b^*_X-b^*_Y)^2]^{1/2}$, wherein X represents values taken on the outer surface coincident with the laser-marked image and Y represents values taken on the outer surface remote from the laser-marked image. The ΔE between the outer surface coincident with the laser-marked image and the outer surface remote from the laser-marked image may be greater than 10 for human legibility. The ΔE between the outer surface coincident with the laser-marked image and the outer surface remote from the laser-marked image may be greater than 40 for machine-legibility.

Optionally, the outer surface can have a Aa that is the absolute value of a* of the outer surface coincident with the laser-marked image minus the a* of the outer surface remote from the laser-marked image. The 95% Delta Color Value Measurement described herein may be used to measure a*. The variable a* is related of the red/green color components of the color.

Optionally, the outer surface can have a Δb that is the absolute value of b* of the outer surface coincident with the laser-marked image minus the b* of the outer surface remote from the laser-marked image. The 95% Delta Color Value Measurement described herein may be used to measure b*. The variable b* is related of the blue/yellow color components of the color.

Figure 7A:
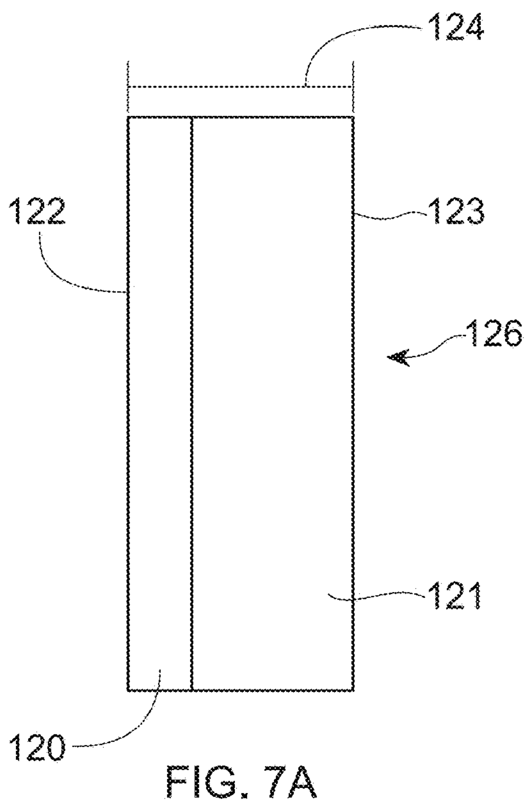
FIG. 7A is a schematic representation of a two-layer sheet of material according to the present invention.

FIG. 7A shows a two-layer sheet material 126 with outer surface 122 and inner surface 123 defining core 124. The distance from the outer surface 122 to the inner surface 123 is the sheet thickness. The sheet thickness can be from about 10.0 microns to about 2.00 mm thick, preferably from about 20.0 microns to about 1.50 mm thick and even more preferably from about 50 microns to about 0750 mm thick. Core 124 has an exterior layer 120 and an inner layer 121. The exterior layer is decorative and includes a colorant/pigment and essentially free of laser marking additives, while the interior layer 121 has a laser marking additive. The laser marking additive in inner layer 121 may be $TiO_2$ or an IR laser marking additive. When the laser marking additive is $TiO_2$, inner layer 121 has an average concentration of $TiO_2$ within the range of from about 5.00% to about 12.00%, preferably from about 5.75% to about 10.00%, more preferably from about 6.00% to about 9.50%, and even more preferably from about 7.00% to about 8.50%, by weight, of inner layer 121. When the laser marking additive is an IR laser marking additive, inner layer 121 has an average concentration of the IR laser marking additive within the range of from about 0.005% to about 2.00%, preferably from about 0.0075% to about 1.80%, more preferably from about 0.010% to about 1.60%, and even more preferably from about 0.020% to about 1.50%, by weight, inner layer 121.

Figure 7B:
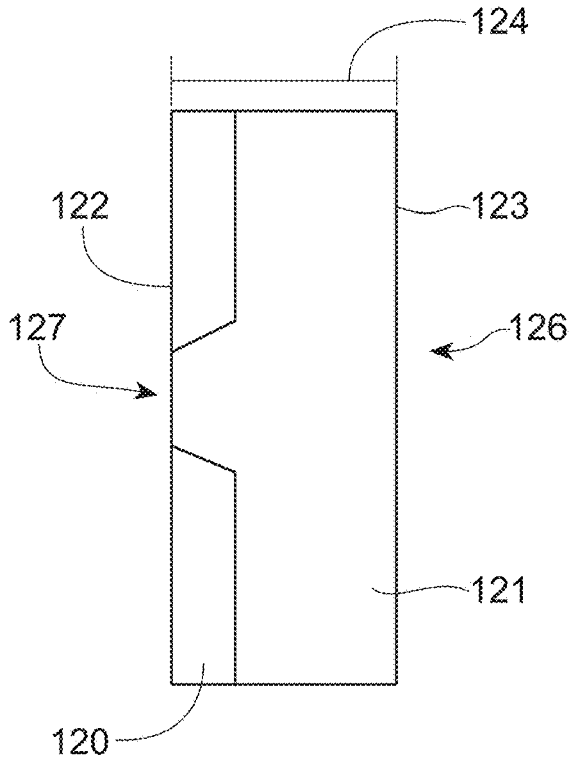
FIG. 7B is a schematic representation of a two-layer sheet of material comprising a patch according to the present invention.
Figure 7C:
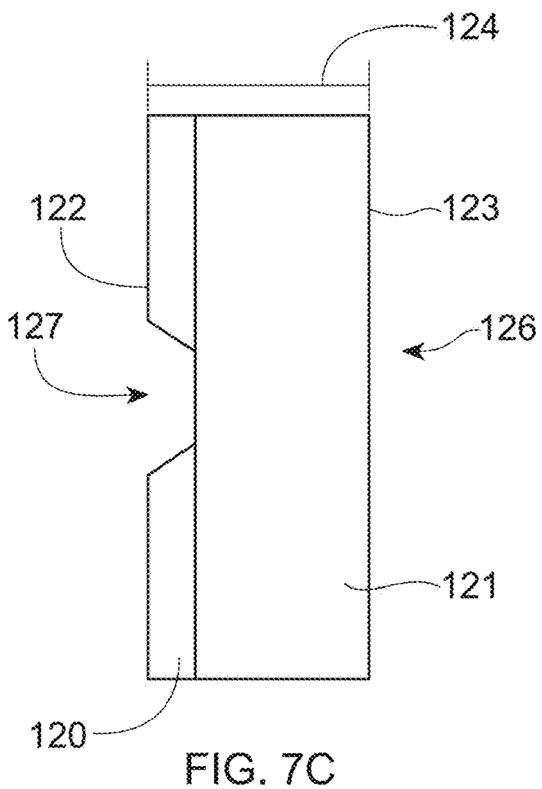
FIG. 7C is a schematic representation of a two-layer sheet of material comprising a patch according to the present invention.

FIGS. 7B and 7C show a two-layer sheet material 126 with outer surface 122 and inner surface 123 defining core 124. The distance from the outer surface 122 to the inner surface 123 is the sheet thickness. The sheet thickness can be from about 10.0 microns to about 2.00 mm thick, preferably from about 20.0 microns to about 1.50 mm thick and even more preferably from about 50 microns to about 0750 mm thick. Core 124 has an exterior layer 120 and an inner layer 121. The exterior layer is decorative and essentially free of laser marking additives, while the interior layer 121 has a laser marking additive. FIGS. 7B and 7C further show patch 127. FIG. 7B shows patch 127 defined by interior layer 121 protruding through outer surface 122. While FIG. 7C shows patch 127 defined by interior layer 121 residing behind a gap in outer surface 122. If sheet material 126 is blow molded into an article as defined above, it would be quite common for patch 127 to be formed in the pre-mold, or parison, as shown in FIG. 7B, and then patch 127 appear as shown in FIG. 7B after the blow molding process.

Figure 8:
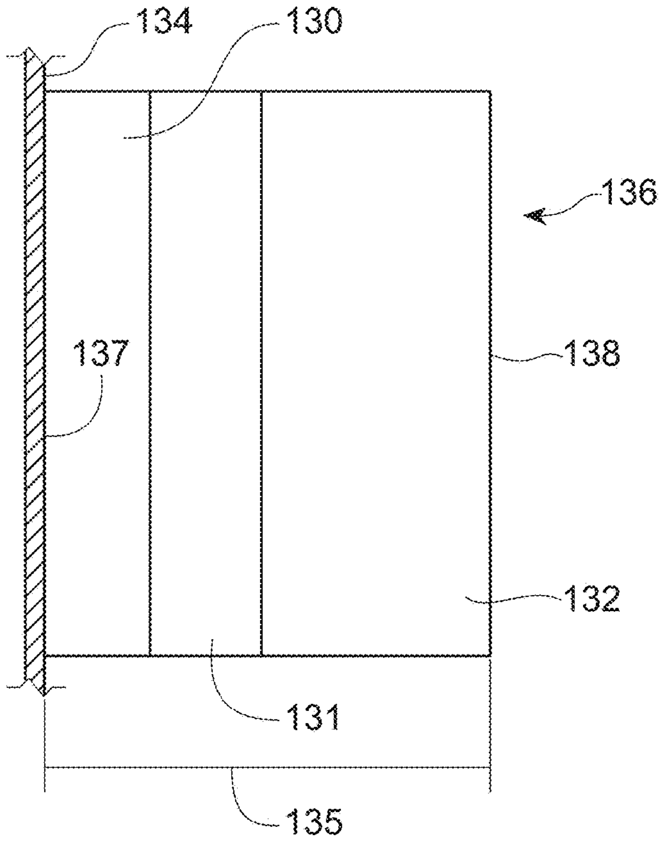
FIG. 8 is a schematic representation of a multilayer sheet of material according to the present invention.

FIG. 8 is a multilayer sheet material 136 with outer surface 137 and inner surface 138 defining core 135. Sheet material 136 is shown with an optional protective layer 134, which can be, for example, a varnish. Protective layer 134 can be added to the sheet material 136 either before or after laser marking of sheet material 136. Sheet material 136 comprises exterior layer 130 and two inner layers 131 and 132. It is understood that there may be three or more inner layers. Exterior layer 130 is the decorative layer which may contain colorants, while inner layer 131 is essentially free from colorants. Exterior layer 130 is the decorative layer essentially free of laser marking additive, while inner layer 131 has a laser marking additive. The laser marking additive in the second layer may be $TiO_2$ or an IR laser marking additive. When the laser marking additive is $TiO_2$, inner layer 131 has an average concentration of $TiO_2$ within the range of from about 5.00% to about 12.00%, preferably from about 5.75% to about 10.00%, more preferably from about 6.00% to about 9.50%, and even more preferably from about 7.00% to about 8.50%, by weight, by weight, of inner layer 131. When the laser marking additive is an IR laser marking additive, inner layer 131 has an average concentration of the IR laser marking additive within the range of from about 0.005% to about 2.00%, preferably from about 0.0075% to about 1.80%, more preferably from about 0.010% to about 1.60%, and even more preferably from about 0.020% to about 1.50%, by weight, of inner layer 131 of IR laser marking additive.

The thickness of the exterior layer may be any appropriate thickness. Often, decorative exterior-layers are made thin relative to the other layers as a means to reduce costs (i.e. of the colorants). The thickness of the exterior layer is from about 5 microns to about 60 microns, preferably from about 10 microns to about 55 microns and more preferably from about 15 microns to about 50 micron as measured from the outer surface of the sheet of material. The second or inner layer begins where the first layer ends. The interior layer 131 may be any appropriate thickness. Often, interior-layers are made thick relative to the other layers as a means to reduce costs (i.e. by including recycled materials in the interior layer). The interior-layer may be from about 5 microns from the outer surface, and begins no greater than 60 micron from the outer surface. The second or inner layer should be at least about 5 microns thick, preferably about 10 microns thick, and more preferably about 15 microns thick. It is understood that there can be three or more inner layers as shown in FIG. 8. If there are only two layers, the outer layer and the second/inner layer, the second/inner layer can be the entire thickness of the sheet of material.

The exterior layer may further comprise a decorative additive selected from the group consisting of sparkle, iridescent or pearlescent pigments such as, coated mica or glass flakes, aluminum flake, coated aluminum flakes, copperflake as well as transparent toners/dyes and matte/frost pigments such as silica and uncoated synthetic mica and combinations of these. The laser marking additive in the second layer may be $TiO_2$ or an IR laser marking additive. When the laser marking additive is $TiO_2$, the second layer has an average concentration of $TiO_2$ within the range of from about 2.50% to about 10.00%, preferably from about 2.75% to about 8.00%, more preferably from about 2.90% to about 7.00%, and even more preferably from about 3.00% to about 6.50%, by weight, of the second layer. When the laser marking additive is an IR laser marking additive, the second layer has an average concentration of the IR laser marking additive within the range of from about 0.005% to about 2.00%, preferably from about 0.0075% to about 1.80%, more preferably from about 0.010% to about 1.60%, and even more preferably from about 0.020% to about 1.50%, by weight, of the second layer.

An article according to the present invention may be formed of a single thermoplastic material or resin or from two or more materials that are different from each other in one or more aspects. The two or more materials may comprise layers within the article. Where the article has different layers, the materials making up each of the layers can be the same or different from any other layer. For example, the article may comprise one or more layers of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof. The article may also comprise cellulosic materials such as pulp or paper. The cellulosic material may be included with an additional second material which may be a second cellulosic material or may comprise a resin including thermoplastic material or water/solvent borne coating.

Recycled thermoplastic and/or cellulosic materials may also be used, e.g., post-consumer recycled ("PCR") materials, post-industrial recycled ("PIR") materials and regrind materials, such as, for example polyethylene terephthalate (PCRPET), high density polyethylene (PCRHDPE), low density polyethylene (PCRLDPE), polyethylene terephthalate (PIRPET) high density polyethylene (PIRHDPE), low density polyethylene (PIRLDPE) and others.

The thermoplastic materials may include monomers derived from renewable resources and/or monomers derived from non-renewable (e.g., petroleum) resources or a combination thereof. For example, the thermoplastic resin may comprise polymers made from bio-derived monomers in whole, or comprise polymers partly made from bio-derived monomers and partly made from petroleum-derived monomers.

Pigments, colorants, and laser absorption additives may be added to the material of any of the layers of the articles of the present invention. Suitable choice of the laser wavelength in combination with pigments/colorants/additives may provide for suitable marking of the article. In cases where the contrast or speed of the marking is not sufficient, these pigments/colorants/additives may facilitate absorption of the laser energy, thereby serving as laser absorption additives. Laser absorption additives, which are known to those skilled in the art, can facilitate forming the laser-marks and can make the laser-markings more vivid and more easily read by users and machines, as well as increase the rate at which the article can be marked. These laser absorption additives generally absorb the laser energy specific to the laser wavelength, followed by initiating a color change to the surrounding matrix (via local heating to cause carbonization, foaming, etc.) or the laser absorption additive itself undergoes a chemical or physical change. Titanium dioxide ($TiO_2$) and carbon black are pigments commonly used to opacify containers in order to protect the contents from the effects of light and can also serve as laser absorption/marking additives depending on the wavelength of the laser being used. Additional examples of laser absorption additives, referred to herein as "IR laser marking additives", include: antimony tin oxide (ATO), ATO coated substrates such as mica, $Sb_2O_3$, indium tin oxide, tin oxides, iron oxides, zinc oxide, carbon black, graphitic carbon, bismuth oxide, mixed metal oxides, metal nitrides, doped metal nitrides, metal carbides, metal borides, tungsten oxides, doped tungsten oxides, micron and sub-micron zero valent metals with non-platelet shape including aluminum, molybdenum, copper, as well as alloys, metal phosphates such as copper phosphate, and mixtures thereof. An example of IR laser marking laser absorption additives are those commonly sold under the tradename "Iriotec®" by Merck KGaA of Darmstadt Germany and LASERSAFE® from Eckart GmbH of Hartenstein Germany.

Laser and Lasing Apparatus

A pulse laser such as a short pulse laser may be used to mark the articles according to the present invention. Lasers for use in the present invention are commercially available and include nano, pico, and femto second lasers. These short pulse lasers can emit pulses applied at high energy-densities and high repetition rates, the high energies and high repetition rates are important to allow laser-marking the article at high speed. The laser marks themselves include marks made by oxidation, reduction, ablation, etching, foaming, and carbonization to the article such as a product or package.

Figure 2:
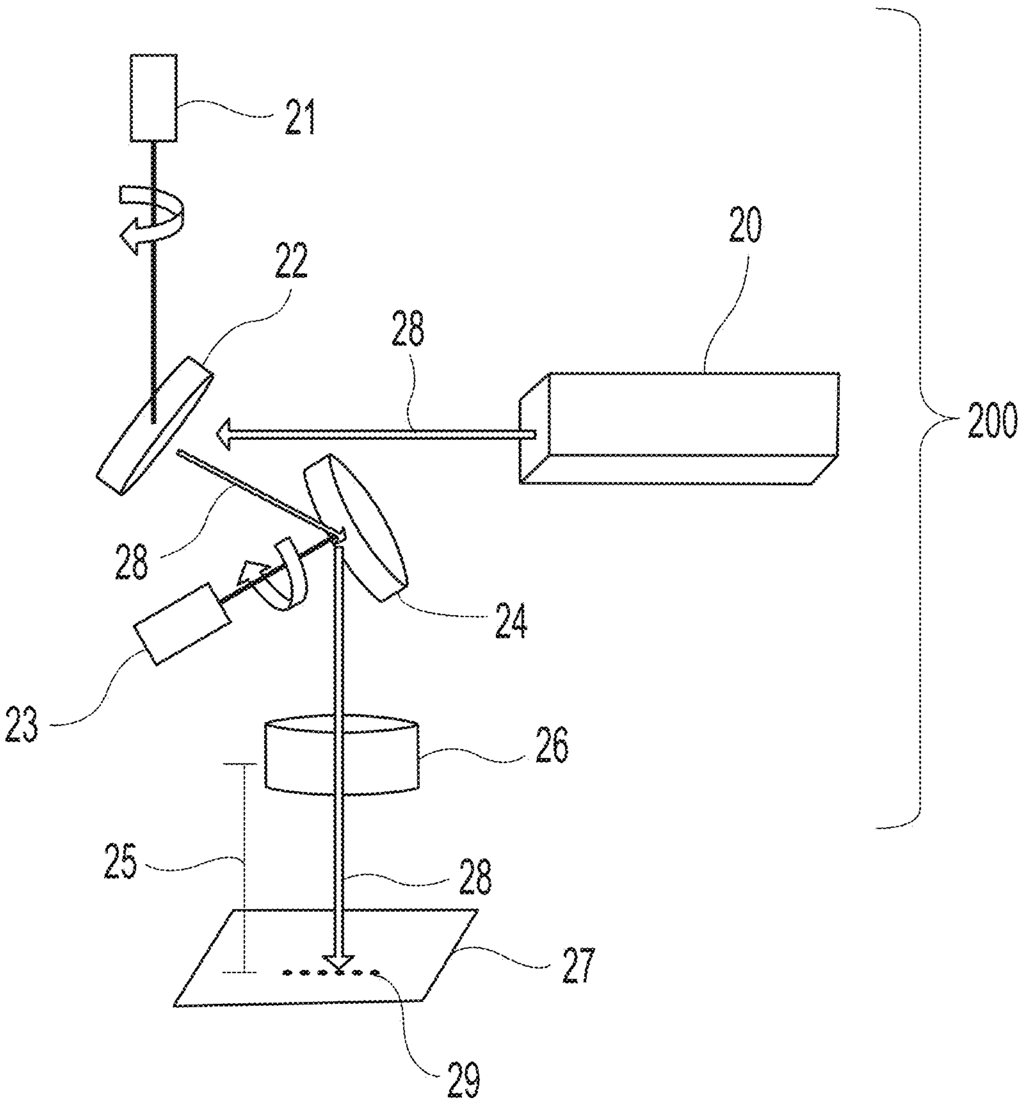
FIG. 2 is a schematic view of a lasing apparatus according to the present disclosure.

Any suitable laser can be used to mark the article 10. FIG. 2 shows one example of a lasing apparatus 200 comprising a laser 20 useful for marking an article in accordance with the present invention. The lasing apparatus 200 includes a laser 20 which may be any laser capable of generating sufficient energy to mark the articles, such as a UV laser, having power in the range of 1 W to 60 W, and a laser wavelength of 355 nanometers or an IR marking laser, having a power in the range of 1 W to 300 W, or even 500 W, and a laser wavelength of 1064 nanometers. Such lasers are available from various suppliers, including an IPG ULPN-355-10-1-3-M marker or YLPN-1-1×350-50-3M MOPA module, available from IPG Photonics of Oxford, MA, United States. Other makes and types of lasers are also possible and different power ranges and settings may be used. The lasing apparatus can include optics that can be used to direct the laser beam, and/or to modify the laser beam such as by changing the energy density and/or spot size of the laser beam 28, as desired.

Frequency or Repetition Rate, measured in Hz, is the number of laser pulses a single laser can deliver in a second. For instance, a 1 MHz laser delivers 1,000,000 pulses per second where a 100 kHz repetition rate laser delivers 100,000 pulses per second. Repetition rate can be important for processing a particular lasing job in a short amount of time (i.e. high-speed laser marking). The more pulses per unit time available correlates (inversely) to the time required to mark a given row for a particular job almost linearly.

Pulse Energy is the amount of energy a single laser pulse contains and is typically measured in μJ or mJ. Typically, pulse energy is in the range of 5 uj to 2000 uJ (2 mJ), preferably in the range of 7 μJ-1000 μJ, and more preferably 10 uJ-300 μJ. The average power of the laser, then, is given as the pulse energy times the repetition rate.

$$\text{Average power}=\text{pulse energy (J)}*\text{rep rate (Hz or 1/sec)}.$$

Peak power is equal to pulse energy divided by pulse duration, and pulse duration can be less than 100 nanoseconds, less than 50 nanoseconds, less than 20 nanoseconds, less than 10 nanoseconds, or less than 1 nanosecond. Therefore, pulse energy and pulse duration are linearly related to peak power. Shorter pulse durations achievable with nanosecond, picosecond and femtosecond lasers allow for very high peak power which aids in the ability to mark articles.

In the lasing apparatus 200 depicted in FIG. 2, the laser 20 projects laser beam 28 onto X-mirror 22 which is rotated by X-galvo 21. X-mirror 22 and X-galvo 21 collectively form an X-galvo set. Laser beam 28 is then projected onto Y-mirror 24 which is rotated by Y-galvo 23. Y-mirror 24 and Y-galvo 23 collectively form a Y-galvo set. The X and Y mirrors 22 and 24 respectively, work together to direct laser beam 28 to the location where the desired mark 29 is to be marked on article 27. Before laser beam 28 reaches article 27, it will typically go through a lens 26. The distance from lens 26 to article 27 is the focal length 25.

The combined optics of the lasing apparatus may function so as to sweep the laser beam across the surface of the article in successive passes. The laser beam may sweep across the article along a first row in the grid in an X-direction, being directed by the X-mirror, while emitting (or omitting) pulses. The combination of the sweep-speed of the laser beam across the surface of the article, also called the surface velocity of the laser beam, and the repetition rate of the laser pulses, then, determines the spacing of marks along the X-direction.

$$X\text{-spacing}*\text{Repetition Rate}=\text{Surface Velocity}$$

The laser may emit a pulse or pulses while sweeping across the article at a given location thereby resulting in a marked location (or locations), or the laser may omit pulse(s) while sweeping across the article at a given location thereby resulting in unmarked location(s) (i.e. void(s)). The laser beam may be swept across the article at a constant surface velocity while emitting and/or omitting pulses. The surface velocity or sweep-speed is defined above. The laser beam may subsequently sweep across the article along a second row of the grid (such as a row adjacent to the first row) while emitting (or omitting) pulses. The laser beam may sweep across the first and second rows in the same direction or in opposite directions. For example, the laser beam may sweep across the first row from "left-to-right" and across the subsequent/adjacent row from "right-to-left".

Those skilled in the art will appreciate that the laser energy must be absorbed by the article's material in order for the article to be marked. The laser energy may be absorbed by the base material of the article or by a laser absorption additive incorporated in the article. The wavelength of the laser can coincide with an absorption band, band gap energy, or surface plasmon/plasma resonance frequency in the UV-vis-NIR-IR spectrum of at least one of the article's base material or a laser absorption additive incorporated into the article. For example, pulse lasers utilizing 355 nm (UV) may be absorbed by $TiO_2$ added to the article, 532 nm (Green) may be absorbed by precious metal nanoparticles like gold, silver and copper. Other laser wavelengths such as 1030 nm-1064 nm or 9-12 μm (Infrared) may be absorbed by PET which may be the base material of the article. Other pairings of laser wavelengths with base materials or laser absorption additives for the article exist and are contemplated herein.

Laser Marking

The articles of the present invention are typically marked by the process of foaming, carbonization, ablation, etching, reduction, oxidation, and/or phase change. The term foaming means a process whereby the laser beam melts and vaporizes a portion of material which creates gas bubbles that become trapped within the molten resin and reflect the light diffusely when cooled. Foaming will generally produce lighter markings in the areas the laser has marked, and this method is most commonly used for dark materials such as plastics or translucent materials. The term "translucent" as used herein means the material, layer, article, or portion of the article being measured has total luminous transmittance of greater than 0% and less than or equal to 90%. The term "opaque" as used herein means the material, layer, article, or portion of the article being measured has total luminous transmittance of about 0%. The total luminous transmittance is measured in accordance with ASTM D1003.

Carbonization based marking is a process that produces strong dark contrasts on bright surfaces and is commonly used on carbon-containing polymers or bio-polymers or natural materials such as such as leather and wood and pulp-based materials. When carbonizing a material, the laser heats up the surface of the material (generally to a minimum 100° C.) emitting oxygen, hydrogen, or a combination of decomposition products. Carbonizing generally leads to dark marks with higher carbon content versus the original material, making it a good choice for lighter colored articles, while the contrast is rather minimally shown on darker materials.

Reduction and oxidation involve the laser energy changing the oxidation state of at least one of the article's components such as a laser absorption additive or opacifying pigment, resulting in a discoloration or color change that is viewed as a mark. For instance, without being bound by theory, the energy imparted from a UV laser can promote the reduction of $TiO_2$ to form a titanium sub-oxide where the oxidation state of titanium has been reduced to less than +4 and whereby this reduction results in a color change from white/colorless to blue, dark blue to black.

There are additional methods of marking an article. For example, annealing is a unique laser process available for metals and other materials. The energy from the laser beam creates an oxidation process below the surface of the material, which results in a change of color on the material surface.

Staining is another marking process achievable as the result of the chemical reaction created on materials when the energy of a laser beam is applied. Variations in color shades will depend on the compositions of the materials being stained. For example, lighter colored plastic materials can often discolor during the laser etching process, resulting in dark marking from the soot particles produced.

Laser engraving is another process that includes removing material as the workpiece surface is melted and evaporated by the laser beam, which produces an impression in the surface being engraved. Removing material is also sometimes referred to as etching or ablating. Laser etching is a process where the laser beam removes the top-most surface of a substrate or coating that was previously applied to the article's substrate. A contrast is produced as a result of the different colors of topcoat and substrate or different topography and texture of the etched region versus the adjacent region. Common materials that are laser marked by way of removing of material include anodized aluminum, coated metals, foils and films, or laminates. The term "etch" as used herein as a noun, refers to the cavity formed when material is removed from a surface. As a verb, the terms "etch" and "etching" refers to the act of removing material from a surface. Etching can be performed mechanically, chemically and thermally (e.g. laser). Although there is no specific limitation on the maximum or minimum depth of an etch, etching depths are typically in the range of about 0.01 mm to about 2.0 mm, including any depth within the range, such as for example, 0.010 mm, 0.075 mm, 0.100 mm, 0.200 mm, 0.300 mm, 0.400 mm, 0.500 mm, 1.0 mm, 1.5 mm and others.

Bleaching or photobleaching (sometimes termed fading) is the photochemical alteration of a chromophore (such as in a pigment or dye) or fluorophore molecule such that its inherent color is permanently lost and/or is unable to fluoresce. This is caused by cleaving of covalent bonds or non-specific reactions between the chromophore/fluorophore and surrounding molecules and can also be affected with laser-marking.

Spot-size relates to the focused area where the laser beam contacts the article. "Spot size" is the diameter of a round spot. The spots are round, but it is possible to achieve elliptical spots by control of the laser beam optics relative to the article. The spot size can be modified by focusing or de-focusing the laser beam, but the "fluence" (=energy per unit area) within the spot decreases as the spot is enlarged or de-focused. Theoretically, the minimum spot-size achievable with any laser is the wavelength of the laser itself. As a practical matter, the minimum spot size achievable with pulse lasers is ~7-20 μm. The spot sizes can be in the range of from about 10 μm to about 150 μm, preferably from about 20 μm to about 100 μm, more preferably from about 30 μm to about 80 μm, and even more preferably from about 40 μm to about 60 μm. As discussed in the Background of the Invention, the spot sizes for conventional laser-markings for date codes (for example using CO2 lasers) and the like are a minimum of 250 μm and can exceed 800 μm. Another way to think about spot size in a marking context is the size of the paintbrush an artist is using to paint. If you want very fine detail, then smaller spots sizes would be utilized. Larger areas to be covered may prefer larger spots sizes. However, laser marking mechanisms require a minimum fluence to achieve the desired mark so balancing pulse energy, pulse duration, pulse overlap and spot size are critical.

Geometry of the mark spacing can contribute to the cycle time and fluence (or energy per unit area) provided to an article. For example, the spacing between marks may be such that the marks do not overlap at all and have 0% overlap. At 0% overlap, each individual laser pulse is responsible for the energy provided to mark the article. If the laser does not have sufficient pulse energy or peak power to achieve a desired mark, then one can decrease the pulse spacing to the point where the spots overlap in either one or both the X and Y-directions; overlapping the spots includes providing more than one laser pulse to the area of the article in which the spots overlap which provides higher fluence or energy per unit area to that portion of the article. Additionally, pulse spacing is a key lever for cycle time. If a laser has a fixed repetition rate or pulse frequency, then to achieve the lowest process-time (also called cycle-time) one would want to spread the pulses out as much as possible while still achieving the desired mark type and mark contrast. In one embodiment of the present invention, the pulses are non-overlapping.

Pulse Duration is the length of time a pulse remains continuously above half its maximum value. The shorter the pulse, the higher the peak power can be created with a common average power. This is because average power=pulse energy (J)*rep rate (Hz or 1/sec). Peak power is equal to pulse energy divided by pulse duration. Therefore, when pulse duration gets significantly smaller, the resulting peak pulse power is significantly higher. This peak power enables improved carbonization, foaming, oxidation, reduction, etc. on the targets being marked. Short pulse lasers take advantage of this phenomenon to mark articles and enable marking mechanisms typically not found in longer pulse lasers.

Modifying the power/fluence output of the laser in creating the laser mark can also be manipulated during marking to create grayscale, also known as dithering. Such a process is a known aspect of the raster-process of laser-marking. Without being bound by theory, it is believed that such dithering during laser-marking also increases process-time in that each laser pulse must be signaled to emit a different power/fluence. In one embodiment of the present invention, the laser pulses are of a constant power. The constant power may be maintained while the laser is marking within an entire row or even as the laser marks among rows over the course of the entire marked pattern.

Grid

As used herein a "grid" or a "bitmap grid" is taken to mean a regular periodic array of locations that may include the plurality of marks. The periodicity of the array includes periodicity in both the X and Y-directions. The plurality of marks within the grid may or may not be present at each of the locations within the grid. That is to say, a mark may be formed at a location within the grid or may be absent at the location (i.e. a void). As mentioned, the lasing apparatus sweeps the laser beam across the article while the laser pulses are either emitted from the laser or no pulse is emitted. A marked location occurs when the laser emits a pulse to a given location and an unmarked location results when the laser does not emit a pulse to a given location. The laser beam may be swept across the article at a constant surface velocity while the repetition rate of the laser is constant, so the periodicity of locations will be regular (i.e. the X-distance) in the direction in which the laser beam is swept across the article (i.e. the X-direction) even though the spacing of marked locations may not be equal, given the possibility of unmarked locations. In the event of unmarked locations, the distance between any marked locations along the same direction (ie. in the X-direction) may be an integer (ie. 2×, 3× or larger) of the smallest distance measured between marks in that direction.

The laser beam may be swept across the article in subsequent rows. The laser beam may be swept from left-to-right or from right-to-left and may sweep in the same direction as it is moved from row to row (e.g. like the carriage-return on a typewriter, as in a raster process) or may be swept in alternating directions as it moves from row to row. A key contributor to reducing cycle-time includes sweeping the laser beam in alternating directions as it moves from row to row. The rows may be generally parallel to one another. The distance between adjacent rows is the Y-distance. The locations in adjacent rows may lie directly above/below one another or may be offset relative to one another. It is appreciated that an offset that is equal to the X-distance results in a realignment of the locations between rows.

An alphanumeric character is a letter or a number, for example, in English the letters are A-Z including upper case and lower case and the universal numbers are 0-9 and combinations thereof. An alphanumeric character is not limited to any particular style or font. Chinese, Japanese (e.g. Kanji, Katakana), Russian, Arabic and other languages have different alphanumeric characters that can be marked.

Those skilled the art will appreciate that the size of a printed, or in this case marked, alphanumeric character is measured by its font. The smallest font generally accepted as readable by a consumer on a marked article is about 6 pt. Font size can increase to very large sizes, but when marking a face of a consumer package, for example, fonts in excess of 20 are impractical as a few characters can fill an entire package. The "faces" of a consumer package are typically the front or back of the package, which faces typically have different markings. For example, the product name and a general product description (shampoo, conditioner, soap, etc.) are typically found on the front, while the ingredient list, UPC code and directions for use are usually on the back. For cylindrical packages, an imaginary vertical plane can be drawn down the bottle with the front face being on one side of the imaginary plane, and the back face being on the opposite side of the imaginary plane.

As previously discussed, the laser marks may be non-overlapping to reduce the time required to mark a given pattern (i.e. "time-to-mark"). Time to mark can be further reduced by spacing-out the marks in either or both of the X- and/or Y-directions, however, this increased spacing can lead to poor legibility of any alphanumeric characters comprising the predetermined pattern. For example, increasing the X-distance allows for a faster surface velocity of the laser beam across the surface of the article when marking a given row (at a constant repetition-rate). Increasing the Y-distance allows for fewer turnarounds in the course of marking a given predetermined pattern.

It has surprisingly been found that, for certain predetermined patterns, increasing the Y-distance (fewer turnarounds) may have a greater impact on reducing time to mark than increasing the X-distance (faster surface velocity). While conventional raster marking processes include equal X- and Y-spacings, the Y-distance that is greater than the X-distance. The X-distance is preferably in the range of from about 0.005 mm to about 0.500 mm; more preferably from about 0.010 mm to about 0.100 mm; and even more preferably from about 0.040 to about 0.075 mm. The Y-distance is preferably in the range of from about 0.010 mm to about 2.0 mm; more preferably from about 0.050 mm to about 0.150 mm; and even more preferably from about 0.060 mm to about 0.075 mm.

When a predetermined alphanumeric character has a font size within the range of 6 pt to 10 pt, the Y-distance may be at least 1.2, preferably 1.5, more preferably 1.7, and even more preferably 2 times the X-distance. When the predetermined alphanumeric feature has a font size within the range of 11 pt to 16 pt the Y-distance is at least 2, preferably 2.5, more preferably 3, and even more preferably 4 times the X-distance.

Figure 3:
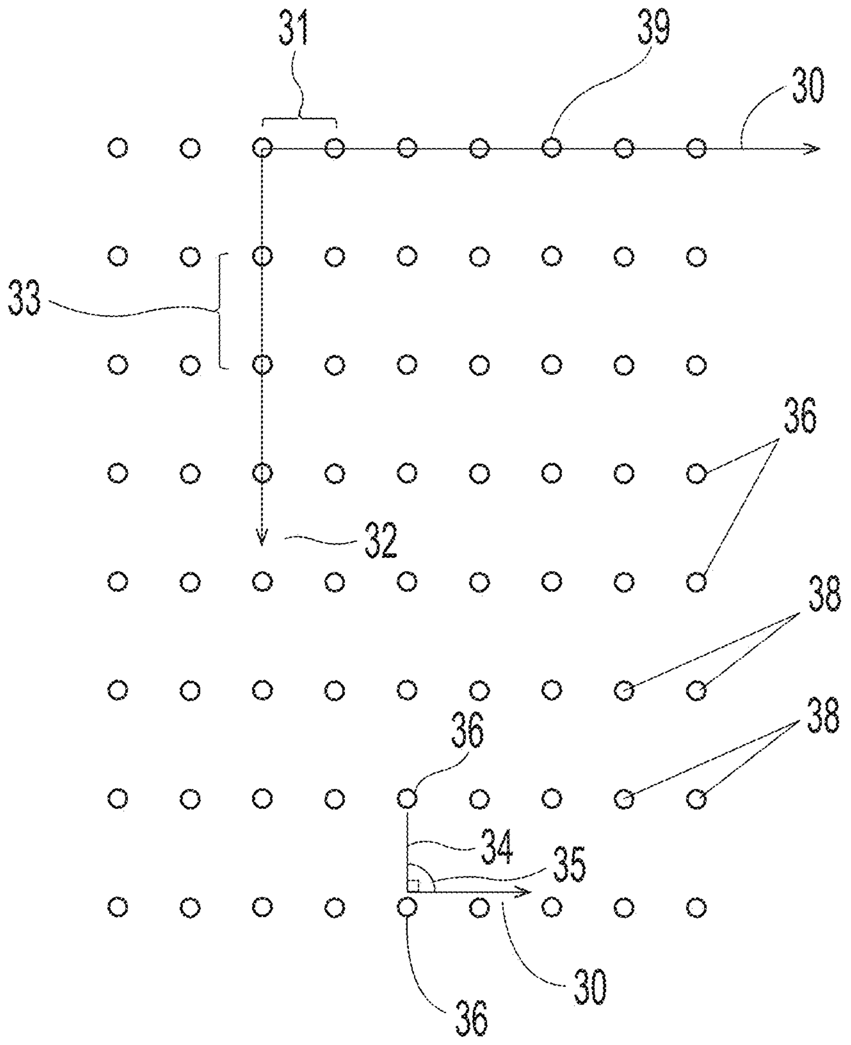
FIG. 3 is a grid according to the present disclosure wherein the locations in adjacent parallel rows are stacked.
Figure 4:
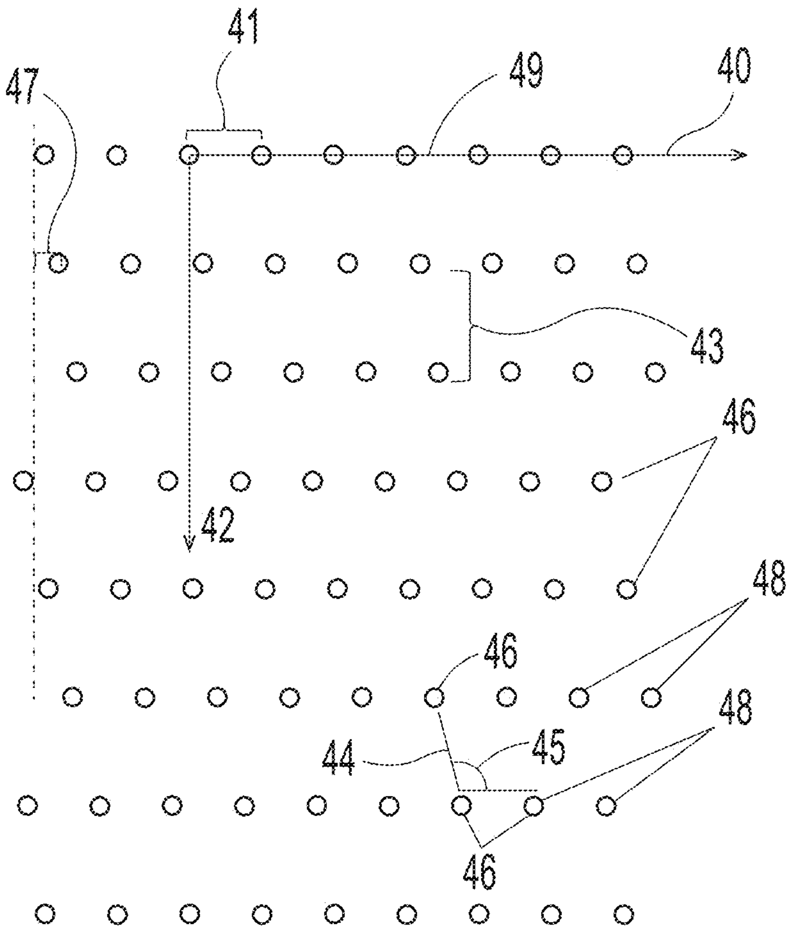
FIG. 4 is a grid according to the present disclosure wherein the locations in adjacent parallel rows are offset.
Figure 5:
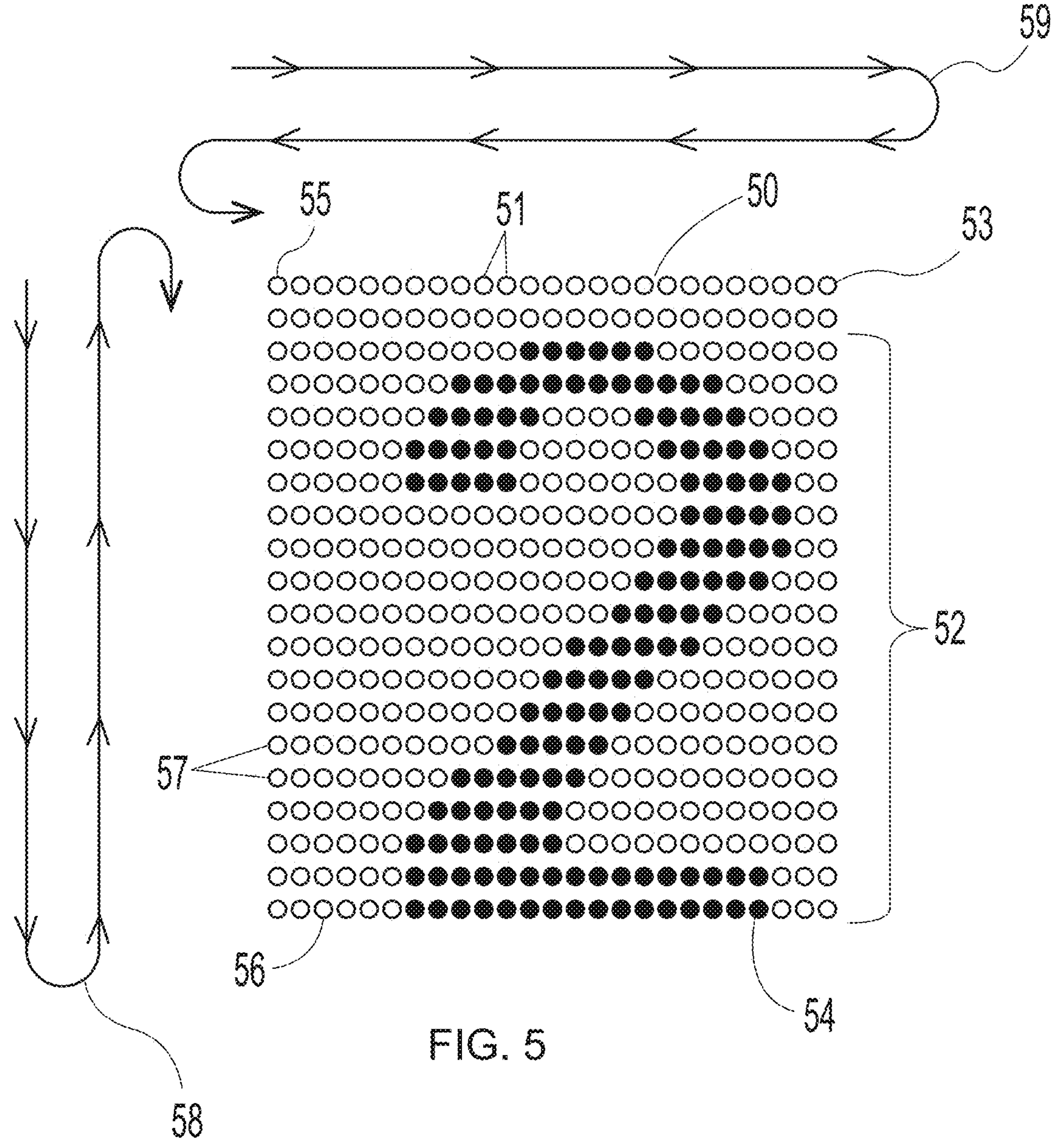
FIG. 5 is an alphanumeric character marked in a grid pattern in accordance with the present invention.

FIGS. 3, 4, and 5 all show various depictions of grids. More specifically, FIG. 3 is a grid 39 illustrating the X-direction 30, Y-direction 32, X-distance 31 and Y-distance 33. Potential marking locations 36 are depicted by the empty circles making up the grid. Further, in FIG. 3 the locations 36 among parallel rows 38 are "stacked" when the angle 35 between locations in adjacent row 34 drawn in the Y-direction between two potential marking locations and the X-direction 30 is approximately 90 degrees. In other words, if one uses vectors to connect neighboring marks from the array to form a parallelogram (i.e. unit cell), when the interior angles of the parallelogram are approximately 90 degrees, the locations are stacked. When the interior angles of the parallelograms differ from 90 degree (i.e. 120 & 60 degrees), the locations are offset. X-distance is measured from the center of one location to the center of an adjacent location in the X-direction.

Those skilled in the art will appreciate that the unit cell of a grid has four symmetrical axes horizontal, vertical, and two diagonals. The laser marking discussed herein can occur along any of those four axes. The vertical and horizontal directions shown in FIG. 5 are described for simplicity. FIG. 5 could be rotated 45 degrees and then the diagonals become vertical and horizontal. Again, the laser marking occurs across one row, then the laser moves up or down to the row above or below, and marks in the opposite direction as shown in FIG. 5.

FIG. 4 is another grid 49 showing an offset 44, having an offset distance 47 between adjacent parallel rows 48. Offset 44 is defined by angle 45 between locations 46 in one row 48 and the nearest location 46 in an adjacent row 48, wherein an offset 44 exists when angle 45 is greater than or less than 90 degrees. FIG. 4 further shows X-direction 40, X-distance 41, Y-direction 42, and Y-distance 43.

FIG. 5 shows an alphanumeric character 52 marked on grid 50. The alphanumeric character is the number "2" and is marked by laser marked locations 54, which are in contrast to unmarked locations 56. When multiple alphanumeric characters are printed, for example, a word, a sentence or a paragraph, the characters sharing the same line of text will also share the same horizontal rows 53 of laser markings. That is, the laser apparatus will go across one row, marking locations as needed for an individual alphanumeric character, then leave the necessary number of unmarked locations between characters, to form a row with markings associated with a plurality of characters in that row. By this method words, sentences, and paragraphs can be marked and be clearly legible to a consumer or machine.

Horizontal rows 53 and vertical columns 55 define grid 50. The distance between marked or unmarked locations (54 or 56) in horizontal row 53 defines X-distance 51. Moreover, the distance between marked or unmarked locations (54 or 56) in vertical column 55 define Y-distance 57. It is important to note that X-distance 51 and Y-distance 57 are defined with respect to the horizontal (53) and vertical (55) orientations, respectively, of the marked indicia, in this case the number "2". But the marked locations 54 can be marked in the horizontal direction 59 or the vertical direction 58. More specifically, when marking in the horizontal direction 59, the laser moves across a horizontal row 53 either marking or leaving unmarked each location (54 and 56, respectively). Then the laser moves down or up one Y-distance and begins traveling across another row above or below the row previously marked. Likewise, when marking in the vertical direction 58 the laser moves up or down a vertical column 55 either marking or leaving unmarked each location (54 and 56, respectively). Then the laser moves across one X-distance and begins traveling up or down a vertical column adjacent the vertical column previously marked.

The aspect ratio of a number or letter is the ratio of its height to its width. The aspect ratio of the number "2" shown in FIG. 5 is greater than 1 because its height is greater than its width. One can easily see that marking the number "2" in the vertical direction 58 requires fewer turn arounds than marking in the horizontal direction 59. Thus, marking this indicia may be faster when sweeping the laser-beam while marking in the vertical direction 58. Many considerations will be taken into effect when deciding to mark in the horizontal or the vertical directions. But the X-distance 51 and the Y-distance 57 when considering the relative spacings and the font size of the alphanumeric characters will always be defined with respect to the horizontal and vertical directions, respectively, with respect to the indica being marked.

The periodicity of the locations comprising the grid includes periodicity in the X-direction and periodicity in the Y-direction. The X-direction and Y-direction may be generally orthogonal to one another. As depicted in FIGS. 3 and 4, the grids 39 and 49, respectively, may take the form of equally spaced locations along successive parallel rows. The direction parallel to the successive parallel rows is taken as the X-direction (30, 40) and the direction generally perpendicular to the X-direction is taken as the Y-direction (32, 42). The spacing between adjacent locations along any of the parallel rows (e.g. in the X-direction) is taken as the X-distance (31, 41), and the distance between adjacent parallel rows is taken as the Y-distance (33, 43).

The grid 39 may be a stacked grid as depicted in FIG. 3. In a stacked grid, the locations where the marks may be applied along a first row are directly above the locations along a second row immediately below the first row. Said another way, the angle 35 formed between the row-segment connecting a first location along the first row with an adjacent location along the first row and the row-segment connecting the first location with its nearest location along the second row is 90°. In a stacked grid, the spacing between adjacent locations along the X-axis is equal to the X-distance 31 and the shortest spacing between adjacent locations between adjacent X-axes is the Y-distance 33.

The grid may be an offset grid as depicted in FIG. 4. In an offset grid 49, the locations where the marks may be applied along a first X-axis are not directly above the locations along a second X-axis immediately below the first X-axis. Said another way, the angle 45 formed between the row-segment connecting a first location along the first X-axis with an adjacent location along the first X-axis and the row-segment connecting the first location with its nearest location along the second X-axis is greater than or less than 90°.

Figure 6B:
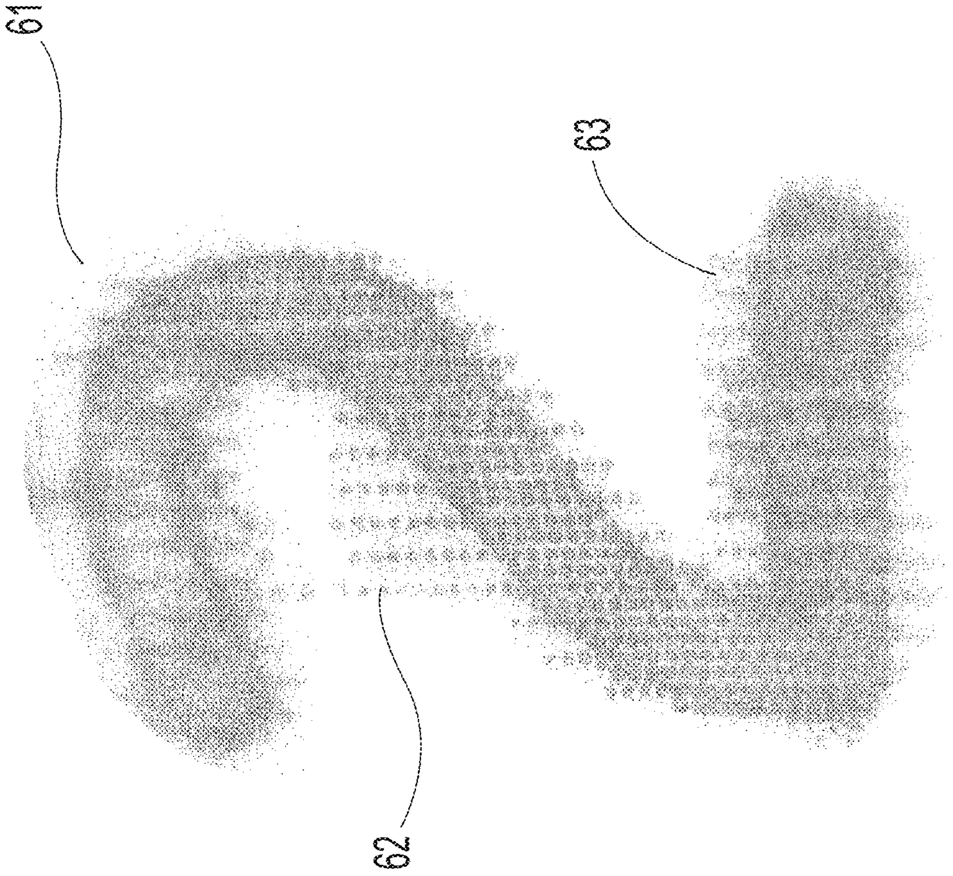
FIG. 6B is an alphanumeric character in a grid pattern marked in accordance with a prior art process.

Those skilled in the art will appreciate that the X-direction and Y-direction are somewhat arbitrarily chosen relative to the predetermined pattern. For example, FIG. 6B depicts an example of a "2" made by laser marking wherein the X-direction is vertical with respect to the marked "2" 61. Those skilled in the art will appreciate that the X-direction could just as easily been horizontal with respect to the marked "2" 61.

Those skilled in the art will appreciate that the grid (e.g. 39 and 49) and the regular spacing between adjacent locations assumes a planar surface of the article. Where the article surface is curved, the spacings may vary with the curvature of the surface.

The X-distance may be consistent among all the parallel rows comprising the grid. That is to say that the X-distance does not change along the X-direction of a given row, nor does it change among the rows of the grid comprising the predetermined pattern. Alternately, the predetermined pattern may include multiple regions where the X-spacing within each region is consistent but different between the regions. For example, one X-distance may be used consistently when marking alphanumeric characters and a different X-distance may be used when marking machine-readable codes such as UPC codes. Similarly, the Y-distance may not change within the predetermined pattern or may vary between regions within the predetermined pattern. The surface velocity of the laser beam and/or the marking direction (i.e. up/down or side-to-side) may also be different between the regions. For example, it is notable that laser-marked articles using a vector marking process generally exhibit variable-spacing of locations/marks along any of their marked directions as the laser speeds-up (causing marks to be spaced further apart) and/or slows-down (causing marks to be spaced closer together) along the course of marking the article. The laser marking may be done at constant speed when the laser is marking. The movement of the laser beam stops after the end of one row along the X-direction, moves up or down to the next row in the Y-direction, and then begins marking the new row also at a constant speed. This speed may also be consistent throughout the marking of the predetermined pattern. Articles marked with the CV-bitmap grid marking process can be distinguished from articles marked with a vector marking process by the regular periodicity of marks and often by the absence of outlines or "borders" that define the marked area, see for example FIG. 6B border 63.

Figure 6A:
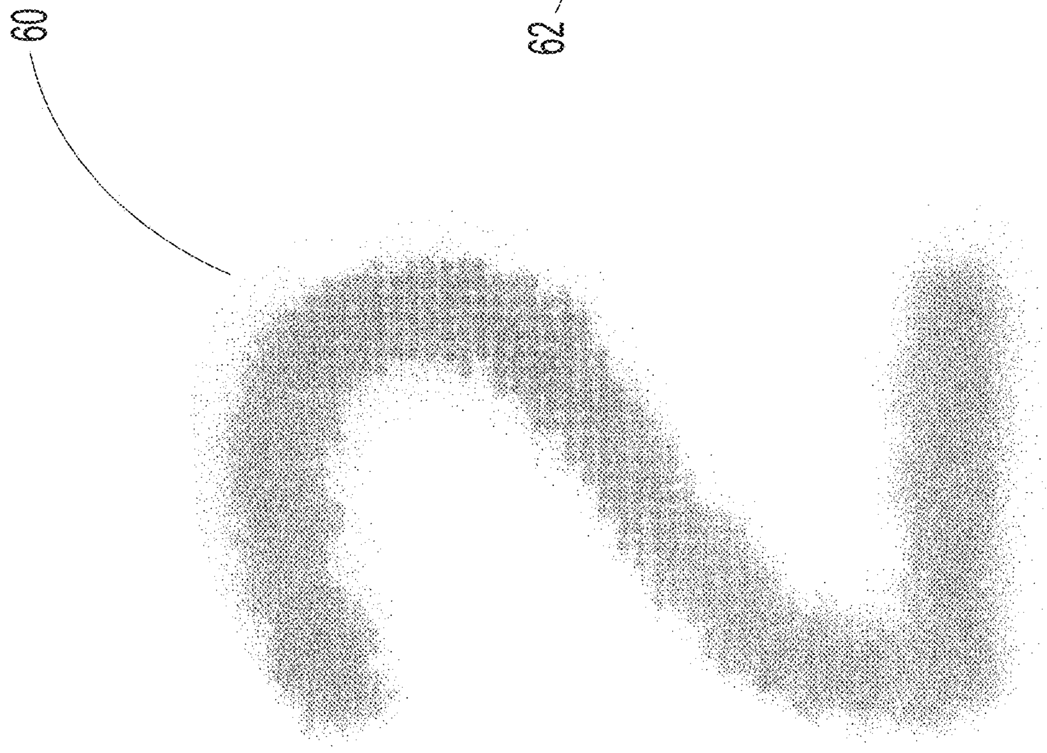
FIG. 6A is an alphanumeric character in a grid pattern marked in accordance with the present invention.

FIGS. 6A and 6B illustrate the difference between laser marking via bitmap grid marking with the inventive CV-bitmap process 6A, and the prior vector marking process 6B. in both cases an alphanumeric character 60 and 61 (i.e the number "2") is marked with a laser. The alphanumeric character 60 is substantially better defined with clean, crisp edges, and very few stray markings. FIG. 6B stands in stark contrast, with largely undefined edges and a substantial number of stray markings 62 outside the border of the alphanumeric character 61. Both characters 60 and 61 were marked in approximately the same amount of time.

High Speed Laser-Marking of Human/Machine-Readable Text, Symbols, and Codes

As discussed, the present invention allows for laser marking of human and machine legible text, symbols, and codes. For example, the invention provides for human and machine legible text, symbols and codes on articles with a decorative/colored outer layer. Further, the invention enables such laser-marking such text, symbols, and codes even when laser-marking at high speed. Laser-marking at high-speed may include laser-marking with pulses of roughly equal energy, and the invention further enables both human and machine-legibility of laser-marked text and codes on decorative articles.

Existing raster processes are slow, but relatively accurate. Vector laser marking processes are faster and accurate at low speeds but can be imprecise at high speeds resulting in unclear markings that are hard to read by consumers or machines. Higher speeds with good precision relative to other marking processes may be provided by such laser marking methods as polygon scanners and CV-Bitmap scanning.

FIG. 6B depicts a potential effect of running a vector-type process at high speed when marking text involving alphanumeric characters and the misplacement of marks within a row. The figure shows many rows displaced from one another where the marking either initiated too early or too late, so that the outline of the alphanumeric character is jagged and the overall appearance is blurred and potentially illegible (e.g. one cannot distinguish an "8" from an "0"). In contrast, the process and resulting patterns created by a constant surface velocity (CV) bitmap path is shown in FIG. 6A. The surface velocity of the laser beam across the surface of the article in the current CV-bitmap process are much faster than those achievable with currently available laser marking processes such as raster and vector marking processes. Current processes typically exemplify surface velocity on the order of 1-2 m/s or less. The CV-bitmap process of the present invention provides for surface velocities above 8 m/s, and further surface velocities equal to or greater than 10 m/s, 15 m/s, 18 m/s, 22.5 m/s, 32.5 m/s, 45 m/s, 60 m/s and even as high as 90 m/s or higher.

The sweep path of the laser beam across the surface of the article can also contribute to reduced cycle time. Conventional raster laser marking processes sweep the laser beam across the rows in either the right-to-left or left-to-right directions, also known as unidirectional, and "jumps" the laser beam back after marking each row to start the subsequent row (like a carriage return on a typewriter). In this way, subsequent rows can be easily registered (i.e. stacked) and grid-locations can be lined-up based on this consistent starting point. To eliminate the jump distance and reduce the time between each marked row, a CV-bitmap process may use a "bi-directional" process in which marking may be done in alternating fashion in both directions (i.e. marking occurs left-to-right in a first row and right-to-left in a subsequent row).

The turnaround profile of the laser beam after completing a row can also contribute to reduced cycle time. The turnaround profile may be symmetric or asymmetric. Given the high speeds at which the laser beam sweeps across the surface of the article, an asymmetric turnaround profile may be preferred.

The choice of the orientation of the marking direction can affect job cycle time, particularly when marking features with a high (or low) aspect ratio. The aspect ratio of the feature is generally taken as the ratio of the height to the width of the feature. Where the height and the width are nearly similar, the aspect ratio is close to 1 and the impact (to job cycle time) of choosing the marking direction relative to the dimensions of the feature may be minimal. However, for features that have a high aspect ratio (e.g. height>>width) or low aspect ratio (e.g. width>>height), job cycle time can be reduced by selecting the marking direction relative to the dimensions of the feature. For example, the marking direction may be chosen to be generally parallel to the longer dimension of the feature (i.e. the major axis) or the marking direction may be chosen to be generally parallel to the shorter dimension of the feature (i.e. the minor axis), see again FIG. 5. While there are many factors affecting job cycle time, it is believed, that corresponding the marking direction to the major axis of the feature reduces the number of turnarounds required when marking the feature, thereby reducing job cycle time.

The choice of the orientation of the marking direction can also affect job cycle time at very high surface velocity. At very high surface velocities, the turnaround time can increase to the point where it dominates the job cycle time. Selecting the marking direction to be generally parallel to the longer dimension of the feature minimizes turnarounds and can reduce job cycle time. As previously discussed, the X- and Y-distances may be different, and this difference can contribute to reduced job cycle, and any loss in clarity of the image(s) of the feature, such as alphanumeric characters, can be compensated by reducing the X-distance while increasing the Y-distance.

Precision Metrics

As discussed, the precision of the placement of the laser-marks can be a contributor to both human-legibility of a marked text or image, and machine-legibility of a marked code. A number of precision metrics can be used to characterize the precision of the placement of the laser-marks. These are elaborated, below.

Precision metrics, generally, rely on determining the dispositions of marked locations. The precision of the laser marks may be determined relative to the predetermined pattern, relative to the grid, or relative to each other. The disposition of the marks can be determined using image analysis, though one of skill in the art will appreciate that any means of determining the dispositions could be used (e.g. pencil and graph paper).

Microscopy

Images for image analysis can be generated by microscopy. A stereomicroscope such as a motorized Zeiss SteREO Discovery.V20 (Carl Zeiss Microscopy, LLC, Thornwood, NY) equipped with color camera such as the Axiocam 305 (5 megapixel CMOS, Carl Zeiss Microscopy, LLC, Thornwood, NY) is used to image characters, digits and images of interest of the sample using reflected light illumination such as achieved with a LED ring light and light source such as a Cold-light source CL 6000 LED lamp (Carl Zeiss Microscopy, LLC, Thornwood, NY). A typical light intensity of 80-100% of the maximum light intensity is used. The individual laser markings that combine to form the character, digit, or images of interest are resolved using suitable magnification using an objective lens such as an Achromat S 1.5× FWD 28 mm (Carl Zeiss Microscopy, LLC, Thornwood, NY) combined with a zoom factor such that the total magnification is between 10× and 345×. By way of example, characters, digits, or images with a font size of 10 pt, the total magnification is about 40× magnification. After the digit of interest is brought into view of the camera, the character, digit, or image is brought into focus using manual skill or, preferably using the autofocus module via the user interface platform (such as Zen V2.6 Blue Edition or higher with Zen Autofocus module, Carl Zeiss Microscopy, LLC, Thornwood, NY). Prior to collecting an image of the characters, digits, or image, the imaging settings are optimized by using an auto exposure option from the user interface platform along with the lamp intensity. Images are collected in the highest resolution format possible, such as ZVI, then exported as Tiff files having resolution of about 2464×2056 pixels. Furthermore, the marked rows of the character, digit, or artwork should be nearly parallel with the horizontal borders of the image. If required, multiple images taken at higher magnification may be accurately stitched together to encompass the full area of the character, digit or image.

Image Analysis

The images from the microscope appear gray but are captured in color. The images are converted to gray scale using an NTSC protocol. A suitable image analysis software is required to perform this and several other image processing steps. Analysis functions implemented by MATLAB available from The Mathworks, Inc., Natick, MA are referenced in this method description.

The microscopy and subsequent image analysis may be pursued over one or more predetermined patterns, a portion of a predetermined pattern, or an individual image within a predetermined pattern such as a graphic or an alphanumeric character. Where the image analysis is to be performed over a portion of a predetermined pattern, prior to the analysis, the portion (such as an individual graphic or alphanumeric character) must be separated from any surrounding images, characters or artwork. A mask may be drawn around the character or image of interest in the predetermined pattern. The mask separates the character or image from other partial characters, digits, bar codes, artwork, dirt or other imperfections that may occur in the image.

The image analysis relies first on identifying the laser marks that comprise the image. The laser marks can be identified by any reasonable means. For example, by repeatedly thresholding the grayscale image from the microscopy. The start threshold is set to capture only a few pixels that fall in some of the markings. The threshold value then progressively changes, capturing an ever-increasing area of the marks. The progressive thresholding continues from the start threshold to a stop threshold. The stop threshold may be determined automatically such as by using MATLAB's "multithresh" function (i.e. Otsu's method). Progressive thresholding can be advantageous in the analysis because the area of markings may overlap and/or merge and the background may not be perfectly uniform. The direction of the threshold progression (i.e., light-to-dark or dark-to-light) can be used to identify dark markings versus a relatively light background or light marking versus a relatively dark background. In the example presented, dark marks are identified versus a relatively light background.

Connected components may then be used to identify individual marks once the area reaches a certain size. A connected-components algorithm is executed with each new threshold to group touching pixels into blobs. When a blob reaches 50% of the area for a mark, it is identified as a mark. The center coordinates of the marks are found using a centroid method as implemented in MATLAB's "regionprops" function. The centers are subsequently used (see below) to determine spacings among adjacent marks in a row (e.g. the X-distance) and spacing between adjacent rows of marks (e.g. the Y-distance).

Determining the Observed X- & Y-Distances and Standard Deviations

A means of expressing the precision of the marked text, image or code in a grid pattern is by the observed X-distance and Y-distance of the grid, as well as their standard deviations. These parameters can be determined using the image analysis, though one of skill in the art will appreciate that any means of determining these distances and standard deviations may be used. One means of determining these values by image analysis includes the use of "Delaunay Triangles". For the Delaunay Triangle method, center coordinates of the marks are passed to MATLAB's "Delaunay Triangulation" function which creates a triangulation based on their center points. Edges of a Delaunay triangulation never cross and the center points are connected in a nearest-neighbor manner.

The X-distance is taken as the distance between adjacent marked locations along a given row within the grid. The adjacent marked locations along a given row result in a horizontal edge within the Delaunay Triangulation data structure. These horizontal edges can be separated from other edges in the triangulation by calculating the angle of the edge. A horizontal edge in a row of the grid will be within +/−10 degrees of the horizontal edge of the image. The grid consists of a periodic spacing of locations along the rows, so the X-spacings should be relatively consistent (e.g. have a low standard deviation). In this analysis a horizontal edge with a length greater than 2 times the programmed distance can be eliminated from consideration as indicative of a non-adjacent location. The observed X-distance determined when analyzing an image such as an alphanumeric character is, then, taken as the average length of horizontal edges between adjacent marks for all marks/rows within the given image or character. The X-distances for a plurality of characters in a macroscopic image can then be averaged further to provide an average X-distance for a given marking condition and a given image or predetermined pattern. Table 1 depicts the observed X-distance for the characters/digits associated with the depicted UPC code for a series of marking conditions.

The Y-distance can be determined as the vertical distance between adjacent rows. In the Delaunay Triangulation a horizontal edge can be part of 2 adjacent triangles. Each base edge contributes 2 vertices to each of the triangles and the third vertex is the nearest-neighbor mark in the adjacent row either above or below the base edge.

For each of the base edges, the perpendicular distance to the nearest mark above and below the base edge is determined. Only the minimum (i.e. nearest) of these two distances is recorded. Using only the minimum distance helps ensure that the row is adjacent and helps prevent double-counting of rows. The average and standard deviation of these perpendicular distances over a given image is then taken as the average Y-distance and standard deviation for the image. The topmost and bottommost rows of the character/digit are not used as the base of measured triangles as they have only one adjacent row. The Y-distances for a plurality of images in a predetermined pattern or portion thereof can then be averaged further to provide an average Y-distance and standard deviation for a given predetermined pattern or portion thereof (such as for a given alphanumeric character).

Displacement

Another means to parameterize the precision of the laser marking when a grid is used is by the percent displacement. As shown in FIG. 6B, imprecise laser-marking may result in substantial displacement or overhang of marks or voids within a row, resulting in blurred images with a jagged outline. Any of a number of means can be used to express the displacement within the rows including simple visual inspection. For example, such a means may include simply observing the character (or other element of a predetermined pattern) and assessing whether it is legible or not, given prior knowledge of the intended marked pattern (e.g. the alphanumeric character). The displacement can also be quantified. Importantly, human- and machine-readable patterns generally include a "smooth" outline (versus the jagged outline shown in FIG. 6B). Said another way, for user-readable and machine-readable patterns, the left-most and right-most marked locations within a given row or marked portion of a row, generally are not substantially displaced (in the X-direction) from the left-most and right-most marked locations (respectively) in the adjacent rows (above and below) relative to the X-distance.

In this quantification of displacement, the start-point of each marked portion within a row for a given character or pattern element is taken as the left-most mark and the finish-point of each marked portion within a row taken as the right-most mark. The start-points and finish-points for each marked portion within a row is determined relative to the corresponding start-point and finish-point (respectively) of the adjacent rows above it and below it. The row under consideration is determined to be "displaced" on the left-side of the character/patter element if the start-points of both the row above and the row below are left of the measured row's start-point, and the row under consideration is determined to be "displaced" on the right-side if the finish-points of both the row above and the row below are right of the measured row's finish-point. The horizontal distance from the start-point (and finish-point) of the row to the start-points (and finish-points, respectively) of the rows above and below are determined, and the displacement is taken as the shorter of these two distances. The left-side displacement being the displacement determined by the start-points and the right-side displacement being the displacement determined by the finish-points. A marked portion within a row may include no displacement, either left- or right-side displacement or both left- and right-side displacement. The top-most and bottom-most rows comprising the image being analyzed (i.e. an alphanumeric character) are omitted from the analysis, as they do not have two adjacent rows. One means to identify the start and finish points of each row uses the Delaunay Triangulation analysis previously discussed for determining the X- and Y-distance(s) and standard deviation(s).

The "% Displacement" for a given image such as an alphanumeric character is the sum of the displacements for the rows comprising the character divided by the number of rows making up the character.

% Displacement=(total displacement in the character)/(number of rows in the character)*100

The "A % D" or Average % Displacement for a predetermined pattern comprising multiple alphanumeric characters as text, is simply the sum of the % Displacement for each character in a sample set divided by "n" the number of characters in the sample.

% Mismarked

Figure 9:
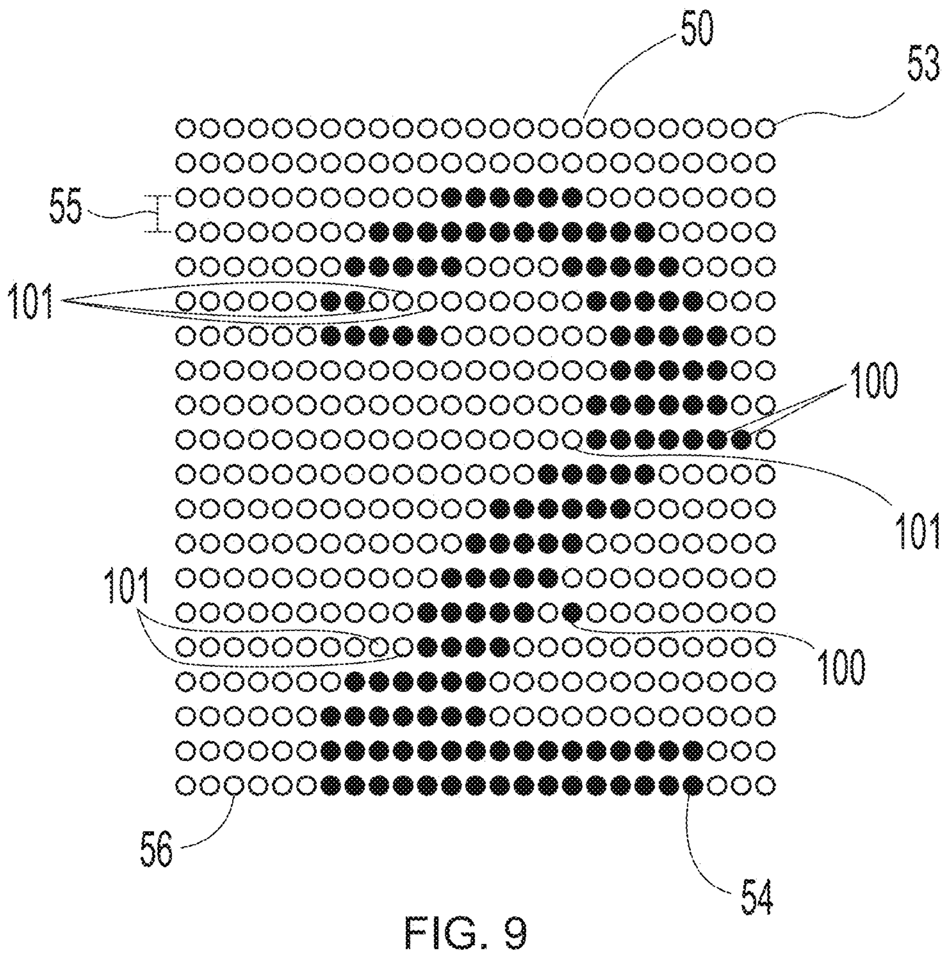
FIG. 9 is a modified version of FIG. 5 to illustrate the % Mismarked calculation.

Yet another method of quantifying the precision is the percent of mismarked locations, or "% Mismarked". Referring now to FIG. 9, which is a modified version of FIG. 5 for illustrative purposes. FIG. 5 shows the alphanumeric character "2" marked in a grid pattern according to the present invention. There are approximately 130 marked locations 54. In FIG. 9, there are 8 voids 101 that should be marked locations. Further, there are 4 marked locations 100 that should be voids. As should be apparent, both the voids that should be marked locations and marked locations that should be voids are mis-marked mistakes, accordingly they are added together and compared to the number of marked locations. In the example of FIG. 9 there are 12 mistakes (8+4) out of a total of 130 desired marked locations. The % Mismarked=the number of mistakes divided by the number of desired marked location times 100, ((12/130)*100)

=9.23%. FIG. 6B shows an egregious mismarked alphanumeric character ("2") wherein the % Mismarked is greater than 20%.

The "average % Mismarked" for a predetermined pattern comprising text is simply the sum of the % Mismarked for each alphanumeric character divided by the number of alphanumeric characters. To achieve the desired readability of text comprised of the alphanumeric characters the average % Mismarked of the alphanumeric characters is less than about 20%, preferably less than about 15%, more preferably less than about 10% and even more preferably less than about 5%. For both the % precision calculation and the standard deviation provision, the following criteria will be used to calculate the averages. The character font must be 6 pt or greater, and there must be at least 10 marked rows per character.

95% Delta Color Value Measurement Method

To measure the 95% Delta Color Value Measurement of a visual effect disposed on an article, a sample must be identified that includes the visual effect to be analyzed. This can be done by visually locating the visual effect to be analyzed, preferably in an area of low curvature or an area which can be made suitably flat using pressure or a frame on the article. The sample is prepared by cutting a rectangular piece from the article in such a fashion that the sample is nearly flat. To obtain the sample, sharp scissors (or other cutting means that will not destroy the sample piece itself) are used to first cut a piece from the article wall A sharp single edge, GEM polytetrafluoroethylene (PTFE) coated stainless steel razor blade such as available from Electron Microscopy Sciences, 1560 Industry Road, Hatfield, PA 19440 (item #71970), or the like, is used to carefully trim the sample down to the desired dimensions. The center of the sample must include both marked and unmarked regions. The sample will be scanned and a circular region of interest (C-ROI) will be analyzed from the center of the sample. The C-ROI should contain at least 50,000 pixels. Pixel count can be calculated from the equation below:

$$NumberPixels = \pi\left(\frac{CircleDiameter}{2} * ScannerResolution\right)^2$$

At least 10% of the circular area of the sample must be made up of a marked region and at least 10% of the circular area of the sample must be made up of non-marked region. The sample can be any suitable size so long as it is larger than a circle positioned at the sample's center with the required diameter. The C-ROI should be free of any cutting-edge artifacts and visible dirt.

Since the visual perception of semi-transparent samples can be affected by the background color, it is best practice to evaluate the samples over a white and a black background. The sample is separately scanned while having a white backing and then a black backing where, for example, the backings can consist of the white and black halfs of the 2856 Byko-chart Brushout 5DX card available from BYK-Gardner, Germany, or an equivalent having a spatially consistent appearance of L*>91, −5<a*<5, and −3<b*<3 for the white backing and spatially consistent appearance of L*<8, −2<a*<2, and −2<b*<2 for the black backing The backing is placed on the opposite surface of the article from which the scan image will be collected. The sample is conditioned at about 23° C.±2 C.° and about 50%+2% relative humidity for 2 hours prior to analysis.

A flatbed scanner capable of scanning a minimum of 24 bit color at 1200 dpi with manual control of color management (a suitable scanner is an Epson PERFECTION V750/V850 Pro from Epson America Inc., Long Beach CA, or equivalent) is obtained and calibrated, as set forth herein. The scanner is interfaced with a computer running color calibration software capable of calibrating the scanner against a color reflection IT8 target utilizing a corresponding reference file compliant with ANSI method IT8.7/2-1993 (suitable color calibration software is MONACO EZCOLOR or I1STUDIO available from X-Rite Grand Rapids, MI, or equivalent). The color calibration software constructs an International Color Consortium (ICC) color profile for the scanner, which is used to color correct an output image using an image analysis program that supports application of ICC profiles (a suitable program is PHOTOSHOP available from Adobe Systems Inc., San Jose, CA, or equivalent). The color corrected image is then converted into the CIE L*a*b* color space for subsequent color analysis (a suitable image color analysis software is MATLAB version 9.12 available from The Mathworks, Inc., Natick, MA).

The scanner is turned on 30 minutes prior to calibration and image acquisition. Any automatic color correction or color management options included in the scanner software are turned off (de-selected). If the automatic color management cannot be disabled, the scanner is not appropriate for this application. The procedures recommended by the color calibration software are followed to create and export an ICC color profile for the scanner. The scanning surface should be free of dirt, dust, streaks, and any other image distorting elements.

Two scans of the sample will be made for the analysis. One scan is performed for each side of the sample. A scan is taken that completely contains the sample and is imported into the image analysis software at 24 bit color with a resolution of at least 1200 dpi (approximately 47.2 pixels per mm) in reflectance mode. The ICC color profile is assigned to the image producing a color corrected sRGB image. This calibrated image is saved in an uncompressed format to retain the calibrated R, G, B color values, such as a TIFF file, prior to analysis.

The sRGB color calibrated image is opened in the color analysis software such as MATLAB which converts it into CIE L*a*b* color space. This is done as follows: First, the sRGB data is scaled into a range of [0, 1] by dividing each of the values by 255. Second, the sRGB channels (denoted with upper case R, G, B), or generically "V" are linearized (denoted with lower case r, g, b), or generically "v" as the following operation is performed on all three channels (R, G, and B):

$$V \in \{R, G, B\}$$

$$v \in \{r, g, b\}$$

$$v = \begin{Bmatrix} \frac{V}{12.92} \text{ if } V \le 0.04045 \\ \left(\frac{V + 0.055}{1.055}\right)^{2.4} \text{ otherwise} \end{Bmatrix}$$

The linear r, g, and b values are then multiplied by a matrix to obtain the XYZ Tristimulus values according to the following formula:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} r \\ g \\ b \end{bmatrix}$$

The XYZ Tristimulus values are rescaled by multiplying the values by 100, and then converted into CIE 1976 L*a*b* values as defined in CIE 15:2004 section 8.2.1.1 using D65 reference white.

The CIE L*a*b* images are analyzed by outlining the sample in each image. This can be done manually or using automated thresholding assuming there is sufficient contrast between the sample and backing described earlier. The outline of the sample is used to create a binary image where inside the outline is the foreground and outside the outline is the background. From the binary image, the centroid of the sample also known as the geometric center of the shape can be found using standard image processing methods such as the "regionprops" function in MATLAB. The center of the shape is used as the center of the C-ROI. The C-ROI should overlay nearly the same area of the sample on both the marked sided and the unmarked side of the article.

The L*, a*, and b* values for each pixel within the C-ROI are compared with the L*, a*, and b* values for every other pixel in the C-ROI. A ΔL* and ΔE are computed for each comparison. They are derived using the following equations:

$$\text{Delta } E_{i,j} = \sqrt{(L_i^* - L_j^*)^2 + (a_i^* - a_j^*)^2 + (b_i^* - b_j^*)^2}$$

$$\text{Delta } L_{i,j}^* = |L_i^* - L_j^*|$$

For each pixel 'i', DeltaL* and Delta E is calculated for every pixel 'j' not equal to 'i'.

A cumulative histogram of these ΔL* and ΔE values are divided by the total number of ΔL* and ΔE measurements. Therefore, the last bin value will be 1, which represents 100% of the Delta measurements. The bin size of the cumulative histogram is set equal to 0.1. The largest bin value less than 95% is recorded as the "95% bin value" for the sample to ignore any remaining noise in the image.

For the results shown in Table X, the diameter of the C-ROI was ~0.2 inches or 254 pixels with a scanner resolution 1200 DPI. This resulted in 50,670 pixels for the analysis. Results are reported for each sample from scanned using the white as well as the black backing.

A series of thermoplastic resin chips containing a suitable grade of pigmentary $TiO_2$ are prepared at concentrations of 0.5, 0.75, 1, 1.5, 2, 3, 5, 7.5 and 10% by use of a single or double screw extruder. Flat parts such as plaques or chips are produced using an injection molding machine such as available from BOY Machines, Inc (Exton, PA 19341 USA). Pigmentary $TiO_2$ is best selected from grades which contain coatings to enable compatibility with the resin to ensure good dispersion and homogeneity across the part. Examples of pigmentary $TiO_2$ intended for use with polyolefins include TIOXIDE® TR48 (Venator, Wynyard Park, UK) and Ti-Pure™ R-103 (The Chemours Company FC LLC, Wilmington, Delaware USA). Since many examples of pigmentary $TiO_2$ have surface coatings, the percent powder added in the extrusion process could be slightly different from expected. For this reason, the % $TiO_2$ content of the chips are confirmed by Inductively Coupled Plasma-Optical Emission Spectroscopy (ICP-OES) and the measured values are used for the Raman Spectroscopy method herein.

Samples from the 0.5, 0.75, 1, 1.5, 2, 3, 5, 7.5 and 10% $TiO_2$ standard chips are cut into smaller pieces using ceramic scissors and knife. Scissors and knife are cleaned between samplings. A blank resin sample (same resin as used for the $TiO_2$ standards) and $TiO_2$ standard samples are prepared (n=1-n=3). Approximately 0.05-0.1 g of sample is transferred and weighed into a pre-cleaned 15 mL TFM UltraWAVE tube (Milestone Srl, Bergamo, Italy). Each sample is combined with digestion agents such as nitric acid, hydrochloric acid and fluoroboric acid. Samples are then fully digested using an UltraWAVE Microwave Digestion System heating to a final temperature of 250-260° C. Samples are then transferred to 50 mL polypropylene tubes, combined with internal standard, and diluted to 50 mL with deionized water. The resulting test solutions are visually checked to confirm full digestion of the sample such that the solution yielded a transparent solution with no fine particulates present. The transparent solutions are analyzed by ICP-OES for Ti. Working standards are prepared by combining appropriately diluted reference standards (Inorganic Ventures, Christiansburg, Virginia, USA) covering the concentration range of interest (45 ppm-145 ppm Ti), together with selected internal standard (Y). The final composition of these working standards are matched to the prepared samples, in terms of acid content, for matrix-matching purposes. Results from analysis of these working standards yield the requisite data to prepare calibration curves for quantitation of titanium. The prepared standard and test samples are analyzed using an ICP-OES analyzer such as an Agilent 5110 ICP-OES (Agilent Technologies, Inc. Santa Clara, CA, USA) using multiple wavelengths to demonstrate adequate selectivity with one wavelength chosen for reporting purposes (Ti 336 nm) and with Yttrium (Y 371 nm) used as the internal standard.

Method to Determine % $TiO_2$ within Specific Layers

Standards of thermoplastic resin with varying amounts of $TiO_2$ are analyzed by Raman spectroscopy using a Raman microscope such as the Renishaw Virsa™ Raman Analyzer (Renishaw plc., Gloucestershire, United Kingdom) equipped with a continuous 785 nm laser with fiber-optic-coupled probe including motorized x/y/z stage, live video camera and halogen or LED light source for white-light sample viewing, and 20×/0.40NA LE Plan Nikon microscope objective. The surface of the sample is located by utilizing the live, white-light video image prior to data acquisition. Spectral acquisition is achieved by means of two-dimensional (2D) mapping by scanning the sample in x, y with respect to the incident laser beam, or by line scans of the standards in the x or y direction. A minimum of 300 of Raman spectra covering an area of 300 $um^2$ or greater are obtained per calibration standard. For each spectrum collected, the area of a unique $TiO_2$ Raman peak that does not interfere with any Raman peak from the host resin is determined, and the resulting value is divided by the area of a unique Raman peak from the host resin. For HDPE, as an example, for each spectrum collected, the % $TiO_2$ is determined by calculating the area of the $TiO_2$ Raman peak centered at around 417 cm-1 and dividing by the spectral signature area of HDPE between 1390 and 1504 cm-1. A calibration curve is generated by calculating the average value of all normalized $TiO_2$ and plotting the result against the % $TiO_2$ as determined from the ICP-OES method. This calibration equation is used to determine % $TiO_2$ within specific layers of an article.

To determine the % $TiO_2$ within specific layers of the article, a suitably flat cross-section of the sample for viewing the internal structure of a potentially layered article is prepared by a method known by those skilled in the art of microscopy. Suitable methods can include using a sharp single edge razor blade and slicing parallel to the layers (cutting perpendicular to the layer thickness direction is not acceptable), cryo-fracture of the article (removal a small region, clamping by using forceps, placing in a liquid nitrogen bath, and breaking when brittle), and/or low energy broad beam cryo-Ion Milling such as by use of the Hitachi IM4000Plus Jon Milling System (Hitachi High-Tech America, Inc., Dallas, Texas). The cross section of the sample is visualized in live time with a white light video camera. Two dimensional (2D) chemical mapping of the cross-section is obtained by focusing the laser beam at or below the cross-sectional surface and scanning across the thickness direction of the cross-section by collecting a data point every 5 μm, preferably every 1 um, with a detector exposure time up to 10 s, and laser power at sample no greater than 20 mW, adjusted accordingly to maximize Raman signal while preventing saturation of the detector or burning of sample. In this manner, spectral data is collected across a region having a width of about ½ of the total cross-sectional thickness dimension (ie. if the thickness of a film is 200 μm, the region analyzed should be 200 μm in the thickness direction×100 μm in the orthogonal direction as viewed via microscope). The full Raman spectral data set is corrected for cosmic rays and baseline prior to image generation. Hyperspectral Raman images highlighting distribution of $TiO_2$ from spectral features unique to $TiO_2$ and host resin such as HDPE as described in above are generated using suitable software such as the Renishaw WIRE™ 5 software. The layers and layer thicknesses are determined by techniques known to one skilled in the art. The concentration of % $TiO_2$ within different layer(s) of the article is obtained by selecting a minimum of 300 Raman spectra from evenly spaced unique locations within a square/rectangle across each interface(s) of the cross-sectional plane containing $TiO_2$. For HDPE, as an example, for each spectrum collected, the % $TiO_2$ is determined by calculating the area of the $TiO_2$ peak centered at around 417 cm-1 and dividing by the spectral signature area of HDPE between 1390 and 1504 cm-1. The calibration curve is used to obtain the average % $TiO_2$ within the discrete layers of the article.

Method for Overall Bar Code Symbol Grade

For verification of linear bar codes, 7 verification parameters (decode, symbol contrast, minimum reflectance, minimum edge contrast, modulation, defects, and decodability) specified by ISO/IEC15416 (2016) are measured by use of an ISO/IEC compliant barcode verifier such as the Axicon 15500 (Axicon Auto ID Limited, Oxfordshire, UK). "Bar codes" are synonymous with the term "symbols" as defined in ISO/IEC15416 (2016). For each of these parameters, a grade from 0 to 4 is assigned per ISO/IEC15416 (2016) where 0 represents failure and 4 represents the highest quality. At least 10 scans which collect the reflectance profile across the full width of the bar code are measured using a ISO/IEC compliant barcode verifier. The scan reflectance profile grade for each scan reflectance profile shall be the lowest grade of any parameter evaluated for that profile. An overall bar code symbol grade is computed by the arithmetic mean of each of the scan reflectance profile grades. The overall bar code symbol grade is reported to the nearest 0.1. For linear barcode symbols, the measurements may be taken using any combination of ISO/IEC recommended aperture diameter, wavelength of light, and angle of incident light.

For verification of two-dimensional bar code symbols including two-dimensional multi-row bar code symbols and two-dimensional matrix symbols, grading is performed as per ISO/IEC15415 (2011) by use of an ISO/IEC compliant 2D barcode symbol verifier such as the Axicon 15500 (Axicon Auto ID Limited, Oxfordshire, UK). Each parameter receives a grade from 0 to 4 where 0 represents failure and 4 represents the highest quality. The parameter having the lowest grade becomes the overall grade for the 2D symbol. For 2-dimensional barcode symbols, the measurement may be taken using any combination of ISO/IEC recommended aperture diameter, wavelength of light, and angle of incident light.

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sheet material that has been marked in a predetermined pattern with a pulsed laser, wherein the sheet material is a layered material that has an outer surface and an inner surface separated by a core, wherein there is a first layer comprising a first material beginning at the outer surface and extending into the core and there is a second layer beginning where the first layer ends, extending to the inner surface and comprising a second material within the core and, the outer surface further comprises a patch, wherein the patch comprises a region of the outer surface where the second material is disposed at the outer surface, and wherein at least a portion of the predetermined pattern of laser marks are disposed in the patch; and wherein the first layer is free of laser marking additives.

2. The sheet material of claim 1 wherein the patch is free from coatings and labels.

3. The sheet material of claim 1 wherein any one layer of the sheet material is polymeric.

4. The sheet material of claim 1 wherein the first material comprises a colorant.

5. The sheet material of claim 4 wherein the first material has an L* of less than 80.

6. The sheet material of claim 5, wherein the first material is colored and, wherein a ΔL of the predetermined pattern of laser marks in the patch is greater than 40, wherein ΔL is the absolute value of L* of the predetermined pattern of laser marks in the patch minus the L* of the outer surface remote from the predetermined pattern of laser marks.

7. The sheet material of claim 6 wherein the patch has an L* value of greater than 90.

8. The sheet material of claim 6, wherein the second material is white.

9. The sheet material of claim 1, wherein the predetermined pattern of laser marks in the patch comprises a machine-readable code.

10. The sheet material of claim 9 wherein the machine-readable code is a linear Bar Code symbol and has an overall symbol grade of 1.5 or better based on verification according to the ISO/IEC15416 (2016).

11. The sheet material according to claim 9, wherein the machine-readable code is a two-dimensional bar code symbol and has a grade of greater than or equal to 1 based on verification according to ISO/IEC15415 (2011).

12. The sheet material of claim 9, wherein the predetermined pattern of laser marks in the patch further comprises alphanumeric text.

13. The sheet material of claim 12 wherein the predetermined pattern of laser marks is a grid pattern that has a plurality of locations positioned in two or more rows, wherein the two or more rows are substantially parallel and each adjacent pair of locations of the plurality of locations along any of the two or more rows is separated by an X-distance and each adjacent pair of the two or more rows is separated by a Y-distance.

14. The sheet material of claim 13 wherein the alphanumeric text has a font size within the range of 6 pt to 10 pt, and wherein the Y-distance is at least 1.2 times the X-distance when the font size is 6 pt to 10 pt.

15. The sheet material of claim 13 wherein the alphanumeric text has a font size within the range of 11 pt to 16 pt, and wherein the Y-distance is at least 2 times the X-distance.

16. An article formed from the sheet material of claim 1, wherein the article comprises an outer surface area and wherein the article is selected from the group consisting of a garbage bag, a bottle, a sachet, a tube, a film, a laminate, a bag, a wrap, a drum, a jar, a cup, and a cap.

17. The article of claim 16, wherein the patch comprises less than 49% of the outer surface area of the article.

18. The article of claim 17 wherein the article and the patch are formed by co-injection or co-extrusion of the first material and the second material as a co-injection or co-extruded sheet material or a co-injection or co-extruded parison.

19. The article of claim 17 wherein the article is a bottle and the article and the patch are formed from blow-molding an injection molded bottle preform comprising the first material and the second material.

* * * * *